US008917697B2

(12) United States Patent
Miki et al.

(10) Patent No.: US 8,917,697 B2
(45) Date of Patent: Dec. 23, 2014

(54) RADIO COMMUNICATION CONTROL METHOD, RADIO BASE STATION APPARATUS AND MOBILE TERMINAL APPARATUS

(75) Inventors: Nobuhiko Miki, Tokyo (JP); Yoshihisa Kishiyama, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 285 days.

(21) Appl. No.: 13/390,524

(22) PCT Filed: Aug. 17, 2010

(86) PCT No.: PCT/JP2010/063847
§ 371 (c)(1),
(2), (4) Date: Mar. 14, 2012

(87) PCT Pub. No.: WO2011/021617
PCT Pub. Date: Feb. 24, 2011

(65) Prior Publication Data
US 2012/0163334 A1 Jun. 28, 2012

(30) Foreign Application Priority Data
Aug. 18, 2009 (JP) ................................. 2009-189505

(51) Int. Cl.
*G01R 31/08* (2006.01)
*H04L 5/00* (2006.01)
(52) U.S. Cl.
CPC .............. *H04L 5/001* (2013.01); *H04L 5/0053* (2013.01)
USPC ........... 370/330; 370/328; 370/329; 370/310; 455/450; 455/464; 455/509

(58) Field of Classification Search
CPC ........... H04W 72/04; H04B 7/28; H04B 7/26; H04L 5/0037
See application file for complete search history.

(56) References Cited

U.S. PATENT DOCUMENTS

| 2007/0060146 | A1* | 3/2007 | Won et al. ...................... 455/445 |
| 2008/0070518 | A1* | 3/2008 | Shinozaki ..................... 455/101 |
| 2009/0003467 | A1* | 1/2009 | Chen ............................. 375/260 |
| 2010/0215002 | A1* | 8/2010 | Kim et al. ..................... 370/329 |
| 2010/0272019 | A1* | 10/2010 | Papasakellariou et al. ... 370/328 |

FOREIGN PATENT DOCUMENTS

JP 2007-221755 A 8/2007

OTHER PUBLICATIONS

International Search Report w/translation from PCT/JP2010/063847 dated Sep. 21, 2010 (2 pages).

(Continued)

*Primary Examiner* — Anez Ebrahim
(74) *Attorney, Agent, or Firm* — Osha Liang LLP

(57) ABSTRACT

To provide a radio communication control method suitable for transmitting a downlink shared channel and a downlink control channel for the shared channel with different base frequency blocks in a communication system in which a plurality of base frequency blocks is combined and the system band is thereby broadened, in the radio communication control method, when different component carriers are assigned to a PDCCH and a PDCCH, to actualize a DCI configuration with a CFI value included in DCI notified on the PDCCH, the DCI is provided with an additional field on which CFI value bits are set. Further, to actualize another DCI configuration with a CFI value included in DCI notified on the PDCCH, part of the DCI field is masked with the CFI value.

9 Claims, 27 Drawing Sheets

(56) References Cited

OTHER PUBLICATIONS

3GPP TSG RAN WG1 #57, R1-092237; "PDCCH structure for multiple carrier aggregation in LTE-Advanced"; LG Electronics; San Francisco, USA, May 4-8, 2009 (9 pages).

3GPP TSG RAN WG1 Meeting #57-bis, R1-092958; "Way Forward on PDCCH in LTE-A"; Los Angeles, California, Jun. 29-Jul. 3, 2009 (2 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Notification of Reasons for Rejection for Japanese Application No. 2009-189505 dated Nov. 20, 2012, with English translation thereof (4 pages).

* cited by examiner (A)

(B)

TRANSMISSION SIGNAL (CFI = 1)

IN THE CASE THAT THE MOBILE STATION ERRONEOUSLY DETERMINES THAT CFI=2

⇩

TRANSMISSION DATA SEQUENCE

SEQUENCE THAT THE MOBILE STATION DETERMINES

|  |  | TWO LOWER-ORDER BITS OF UE-ID | | | |
|---|---|---|---|---|---|
|  |  | 00 | 01 | 10 | 11 |
| C F I | 1 | 00 | 01 | 10 | 11 |
|  | 2 | 01 | 10 | 11 | 00 |
|  | 3 | 10 | 11 | 00 | 01 |

FIG.30

RADIO COMMUNICATION CONTROL METHOD, RADIO BASE STATION APPARATUS AND MOBILE TERMINAL APPARATUS

TECHNICAL FIELD

The present invention relates to a radio communication control method, radio base station apparatus, and mobile terminal apparatus in the next-generation mobile communication system.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Document 1). In LTE, as a multiplexing scheme, OFDMA (Orthogonal Frequency Division Multiple Access) different from W-CDMA is used in downlink, and SC-FDMA (Single Carrier Frequency Division Multiple Access) is used in uplink.

In the 3 G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). It is conceivable that such a plurality of mobile communication systems coexists in the further. Systems of LTE-A that are currently studied are required to ensure backward compatibility with LTE.

CITATION LIST

Non-Patent Literature

[Non-patent Literature 1] 3 GPP, TR25.912 (V7.1.0), "Feasibility study for Evolved UTRA and UTRAN", September 2006

DISCLOSURE OF INVENTION

Technical Problem

In addition, in LTE-A, it is determined that a plurality of base frequency blocks with a system band of the LTE system (release-8) as a unit is combined to broaden the system band.

The present invention was made in view of such a respect, and it is an object of the invention to provide a radio communication control method, radio base station apparatus and mobile terminal apparatus suitable for transmitting a downlink shared channel and a downlink control channel for the shared channel with different base frequency blocks in a communication system in which a plurality of base frequency blocks is combined and the system band is thereby broadened.

Solution to the Problem

A radio communication control method of the invention is characterized by having the steps of assigning a plurality of base frequency blocks to transmission data in a transmission time unit, while assigning another base frequency block to a downlink control signal associated with transmission data assigned one base frequency block, including assignment information indicative of an assignment position in the transmission time unit of the downlink control signal in the downlink control signal, and transmitting the downlink control signal including the assignment information with the another base frequency block.

A radio communication control method of the invention is characterized by having the steps of receiving a plurality of base frequency blocks, decoding assignment information indicative of an assignment position in a transmission time unit of a downlink control signal from a reception signal of a base frequency block for each of received base frequency blocks, decoding a downlink control signal from each base frequency block based on decoded assignment information of each base frequency block, extracting assignment information included in a detected downlink control signal in the case of detecting the downlink control signal associated with transmission data of a different base frequency block from the base frequency block assigned the downlink control signal among decoded downlink control signals, and decoding the transmission data of the different base frequency block based on the extracted assignment information.

According to the invention, when another base frequency block is assigned to a downlink control signal associated with transmission data assigned one base frequency block, a downlink control signal including the assignment information indicative of an assignment position of the downlink control signal is transmitted with another base frequency block. Accordingly, when a user terminal is capable of decoding the downlink control signal including the assignment information in the another base frequency block without error, the terminal is capable of also receiving the assignment information included in the downlink control signal without error. It is possible to prevent the occurrence of a defect which is caused by properly receiving a downlink control signal while erroneously receiving assignment information indicative of the assignment position.

Technical Advantage of the Invention

In the invention, it is possible to provide a radio communication control method, radio base station apparatus and mobile terminal apparatus suitable for transmitting a downlink shared channel and a downlink control channel for the shared channel with different base frequency blocks in a communication system in which a plurality of base frequency blocks is combined and the system band is thereby broadened.

BRIEF DESCRIPTION OF DRAWINGS

FIG. 30 is a diagram illustrating preferable combinations of two lower-order bits of the CFI value and two lower-order bits of the user identifier (UE-ID).

DESCRIPTION OF EMBODIMENTS

Figure 1:
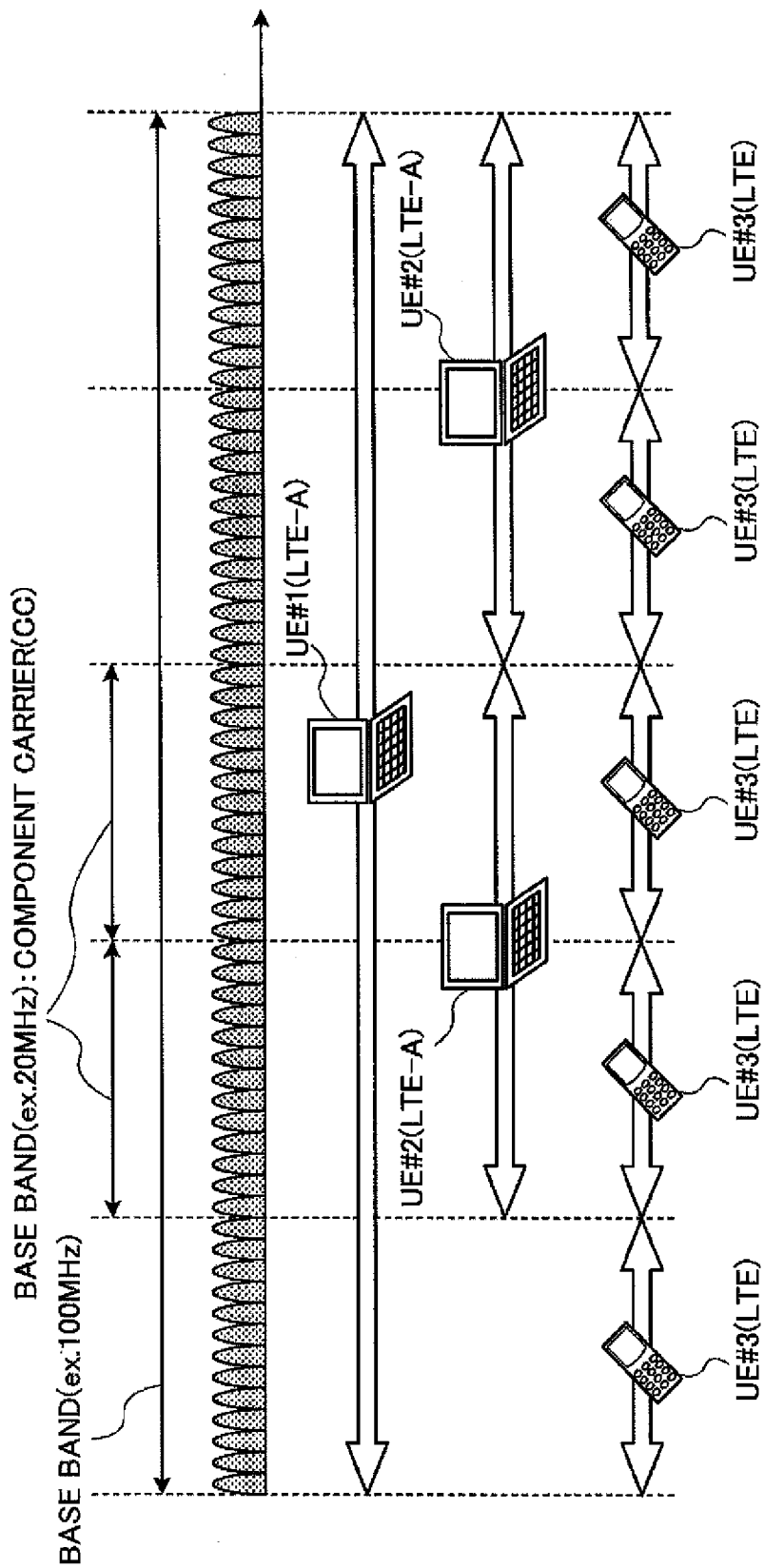
FIG. 1 is a diagram to explain system bands in LTE and LTE-A systems.

FIG. 1 is a diagram illustrating a hierarchical bandwidth configuration determined in LTE-A. The example as shown in FIG. 1 is of the hierarchical bandwidth configuration in the case of coexistence of LTE-A systems that are first mobile communication systems having first system bands comprised of a plurality of base frequency blocks, and LTE systems that are second mobile communication systems having a second system band comprised of a single base frequency band. In the LTE systems, for example, radio communications are performed with a variable system bandwidth of 100 MHz or less, and in the LTE system, radio communications are performed with a variable system bandwidth of 20 MHz or less. The system band of the LTE-A system is at least one base frequency block with a system band of the LTE system as a unit. In LTE-A, the base frequency block is referred to as a component carrier (CC). Thus combining a plurality of base frequency bands to expand the band is referred to as carrier aggregation.

For example, in FIG. 1, the system band of the LTE-A system has a system band (20 MHz×5=100 MHz) containing bands of five component carriers where the system band (base band: 20 MHz) of the LTE system is one component carrier. In FIG. 1, a mobile terminal apparatus UE (User Equipment) #1 is a mobile terminal apparatus supporting the LTE--A system (also supporting the LTE system), and is capable of supporting the system band up to 100 MHz. UE#2 is a mobile terminal apparatus supporting the LTE-A system (also supporting the LTE system), and is capable of supporting the system band up to 40 MHz (20 MHz×2=40 MHz). UE#3 is a mobile terminal apparatus supporting the LTE system (not supporting the LTE-A system), and is capable of supporting the system band up to 20 MHz (base band).

Figure 2:
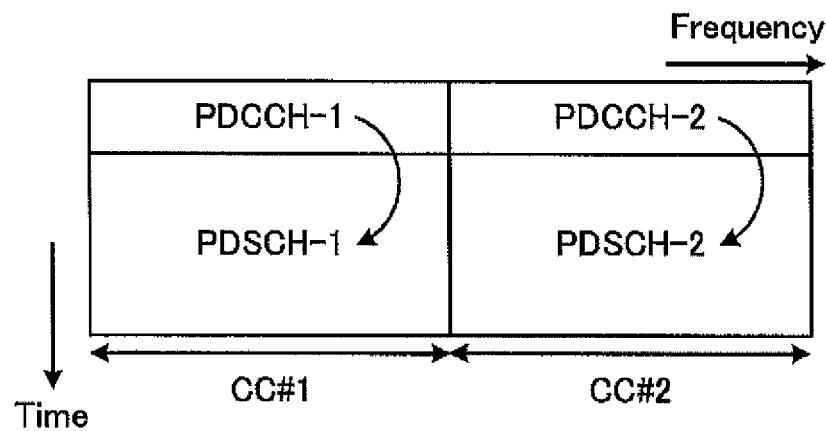
FIG. 2(A) is a diagram illustrating that a PDSCH and PDCCH for the PDSCH are transmitted with the same component carrier.
FIG. 2(B) is a diagram illustrating that a PDSCH and PDCCH for the PDSCH are transmitted with different component carriers.
Figure 2:
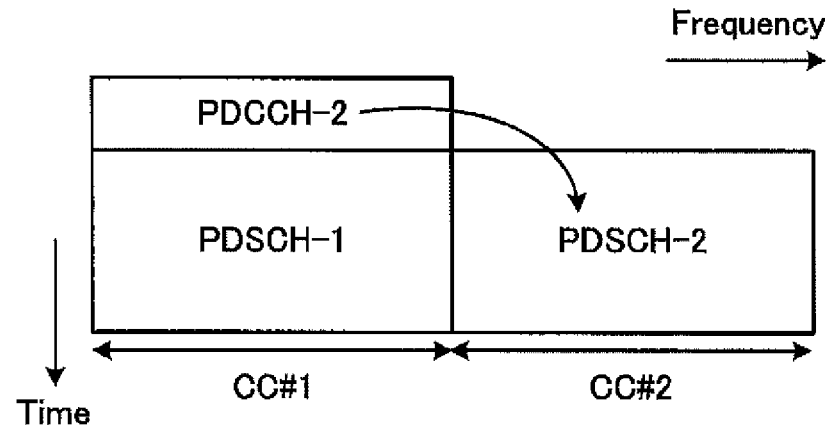

In radio communications in thus broadened system band, two methods as shown in FIGS. 2(A) and 2(B) are conceivable as a method for transmitting a downlink control channel to notify of information required for traffic channels (PDSCH (Physical Downlink Shared Channel) reception, PUSCH (Physical Uplink Shared Channel) transmission). In the method as shown in FIG. 2(A), the PDSCH and the PDCCH for the PDSCH are transmitted with the same component carrier. More specifically, PDSCH-1 is assigned to component carrier CC#1, and PDSCH-2 is assigned to a different component carrier, CC#2. PDCCH-1 that is control information on PDSCH-1 is transmitted with the same component carrier CC#1 as the PDSCH-1, and PDCCH-2 that is control information on PDSCH-2 is transmitted with the same component carrier CC#2 as PDSCH-2. The user terminal decodes the PDCCH to acquire the control information of the PDSCH, and according to the control information, decodes the PDSCH.

In the method as shown in FIG. 2(B), the PDSCH and the PDCCH for the PDSCH are transmitted with different component carriers. More specifically, as in FIG. 2(A), PDSCH-1 is assigned to component carrier CC#1, PDSCH-2 is assigned to a different component carrier, CC#2, but a notification method of PDCCH-2 that is control information of PDSCH-2 is different from the method of FIG. 2(A). In other words, PDCCH-2 is transmitted with the component carrier #1 that is different from that of the PDSCH-2.

The inventors of the invention noted the respect that in the LTE-A system with the system band broadened by carrier aggregation, in the case of adopting the notification method of PDCCH-2 with component carrier CC#1 different from that of PDSCH-2 as shown in FIG. 2(B), there is a possibility that PDSCH-2 transmitted with the different component carrier (CC#2) is not properly decoded even when PDCCH-2 is decoded without error.

The specific description will be given below. In the LTE/LTE-A system, information to transmit as downlink L1/L2 control signal is capable of including control channel format information (CFI: Control channel Format Indicator), ACK/NACK information in response to uplink shared channel (PUSCH) transmission data, and resource allocation information (DCI: Downlink Control Information) of uplink/downlink shared channels. The DCI mainly includes radio resource allocation information, and is capable of including control information such as a transmission power control command other than radio resources. Therefore, the DCI may be called the downlink control information. The downlink L1/L2 control information is transmitted on the PCFICH (Physical Control Format Indicator Channel), PHICH (Physical HybridARQ Indicator Channel) and PDCCH. These control signals are time-multiplexed with the PDSCH, and notified with first n OFDM symbols of the first slot in each subframe. The subframe is a transmission time unit in user data transmission.

Figure 3:
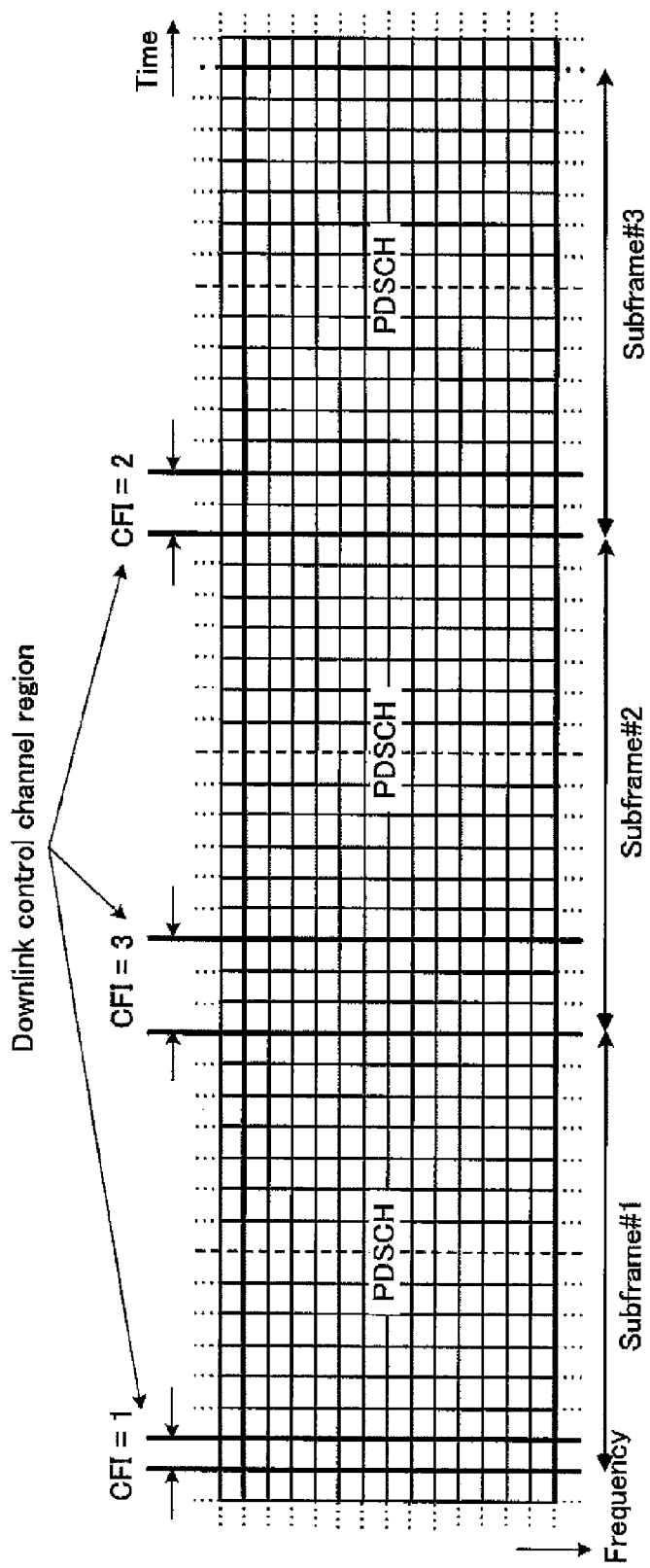
FIG. 3 is a diagram illustrating a downlink control channel configuration illustrating the relationship between a control channel region and a data region.

On the PCFICH, the number (n) of OFDM symbols assigned the PDCCH in one subframe is notified by a 2-bit CFI value. In the region designated by the CFI value are arranged signals of the PCFICH, PHICH, and PDCCH. In each subframe, the region designated by the CFI value can be referred to as a control channel region, and in each subframe, the region with signals of the PDSCH (which is mainly user data and is capable of including part of control signals) arranged can be referred to as a data region. FIG. 3 exemplifies the relationship between the control channel region and the data region. Subframe #1 is of the case of notifying of CFI=1, where the control channel region is multiplexed into a first OFDM symbol of the first slot, and the data region starts from a second OFDM symbol of the first slot in the subframe. In other words, the CFI value notified for each subframe indicates the boundary between the control channel region and the data region in each subframe.

In the case of the notification method of the PDCCH as shown in FIG. 2(B), when the PCFICH transmitted with the component carrier (CC#2) is erroneous, the PDSCH-2 start position indicated by a CFI value notified on the PCFICH is erroneous. As a result, there occurs a phenomenon that PDSCH-2 is not decoded properly. Particularly, when PDCCH-2 is decoded without error, the failure of decoding and retransmission request are repeated on PDSCH-2, and significant waste arises.

Therefore, in the invention, to cope with the case of transmitting a PDSCH and the PDCCH that is control information of the PDSCH with different component carriers, adopted are two kinds of (A) control channel configuration in which DCI notified on the PDCCH includes a CFI value that is to be notified on the PCFICH, and (B) configuration for masking a CRC.

In one aspect of the invention, to actualize the DCI configuration in which the DCI notified on the PDCCH includes a CFI value, the DCI is provided with an additional field on which a CFI-value bit is set.

Figure 4:
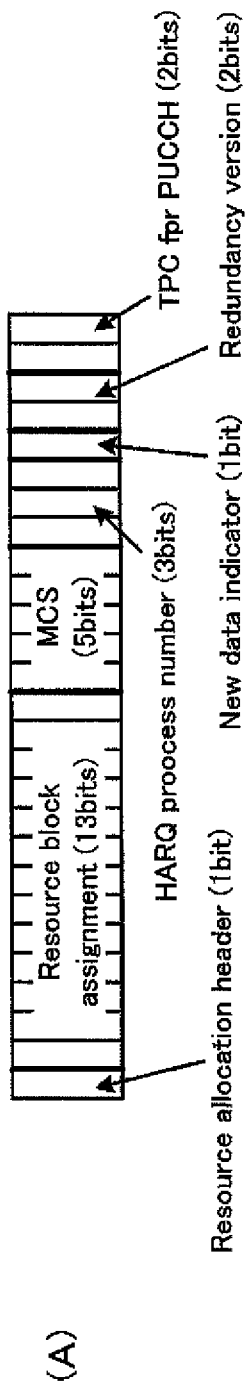
FIG. 4(A) is a DCI configuration diagram defined in the LTE system (release-8)
FIG. 4(B) is a DCI configuration diagram when the PDSCH and PDCCH are transmitted with different component carriers.
Figure 4:
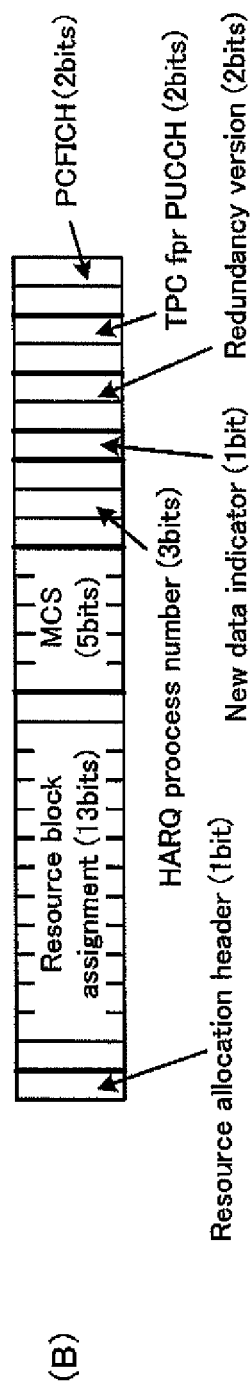

FIGS. 4(A) and 4(B) show DCI configurations. FIG. 4(A) shows a DCI configuration defined in the LTE system (release-8), and FIG. 4(B) a preferable DCI configuration in transmitting a PDSCH and the PDCCH that is control information of the PDSCH with different component carriers. The DC1 configuration defined in the LTE system (release-8) is provided with resource block allocation information for each terminal, MCS (Modulation and Coding Scheme) information of the highest efficiency that meets the assigned resource block error rate, information required in using hybrid ARQ that is used in correcting reception data errors occurring on the terminal side with high efficiency and low delay, more specifically, an HARQ process number indicative of corresponding memory in combining first transmission and retransmitted packet, new data indicator to distinguish between new data and retransmission data, information (redundancy version) indicative of a portion of redundancy that is transmitted in HARQ, and transmission power control command (TPC for PUCCH) for the PUCCH, and is comprised thereof.

The DCI configuration shown in FIG. 4(B) is provided with an additional field on which a CFI value to be notified on the PCFICH is set, in addition to the DCI field configuration defined in the LTE system (release-8). Herein, the CFI value indicates a CFI value of a corresponding PDSCH. The additional field is transmitted using the PCFICH on the physical channel. By providing the DCI configuration with the CFI field added thereto, since the DCI and CFI value are integrally transmitted, when the PDCCH (DCI field) is decoded without error, the CFI field is also decoded properly always. Accordingly, even when the PDSCH and the PDCCH that is control information of the PDSCH are transmitted with different component carriers, it is possible to resolve the defect that a CFI value is erroneous although the PDCCH (DCI field) is decoded without error.

In another aspect of the invention, to actualize a DCI configuration in which the DCI notified on the PDCCH includes a CFI value, part of the DCI field is masked with a CFI value.

Figure 5:
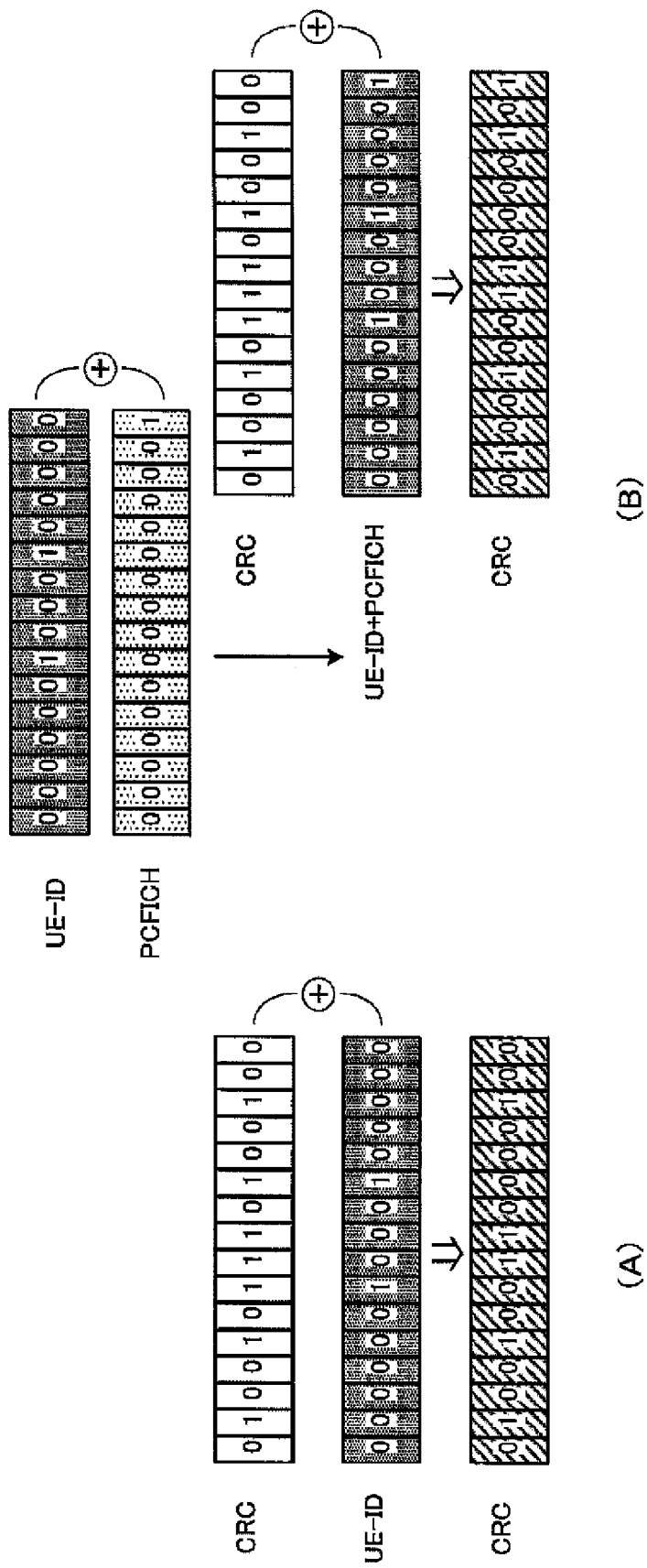
FIG. 5(A) is a conceptual diagram for masking a CRC with a user identification number.
FIG. 5(B) is a conceptual diagram for masking a CRC with the user identification number and CFI value.

Referring to FIGS. 5(A) and 5(B), described is a method of masking a CRC (Cyclic Redundancy Check) code added to the DCI with a user identifier (UE-ID). FIG. 5(A) is a conceptual diagram when the DCI configuration does not include a CFI value. The 16-bit CRC code is added to the end of the DCI field. Only the added CRC code is masked with a user identifier (UE-ID) assigned for each user. As the masking technique, performed is an operation of an exclusive OR between the CRC code and the user identifier (UE-ID). The user terminal restores CRC using the user identifier (UE-ID) assigned to the user.

In the method as shown in FIG. 5(B), performed is masking using the user identifier (UE-ID) and masking using a CFI value. The mask is generated by an exclusive OR operation between the user identifier (UE-ID) and the CFI value, and the CRC code is masked using the mask. In FIG. 5(B), the mask is generated by an exclusive OR operation between the user identifier (UE-ID) and the CFI value, but the invention is capable of applying masking techniques other than the exclusive OR operation.

Thus, by masking part of the DCI field with a CFI value, it is possible to suppress the bit length of the DCI configuration and include the CFI value in the DCI. In the invention, part of the DCI field to mask with the CFI value is not limited to the CRC code.

An Embodiment of the invention will specifically be described below with reference to accompanying drawings.

Described herein is the case of using the radio base station apparatus and mobile terminal apparatus that support the LTE-A system.

Figure 6:
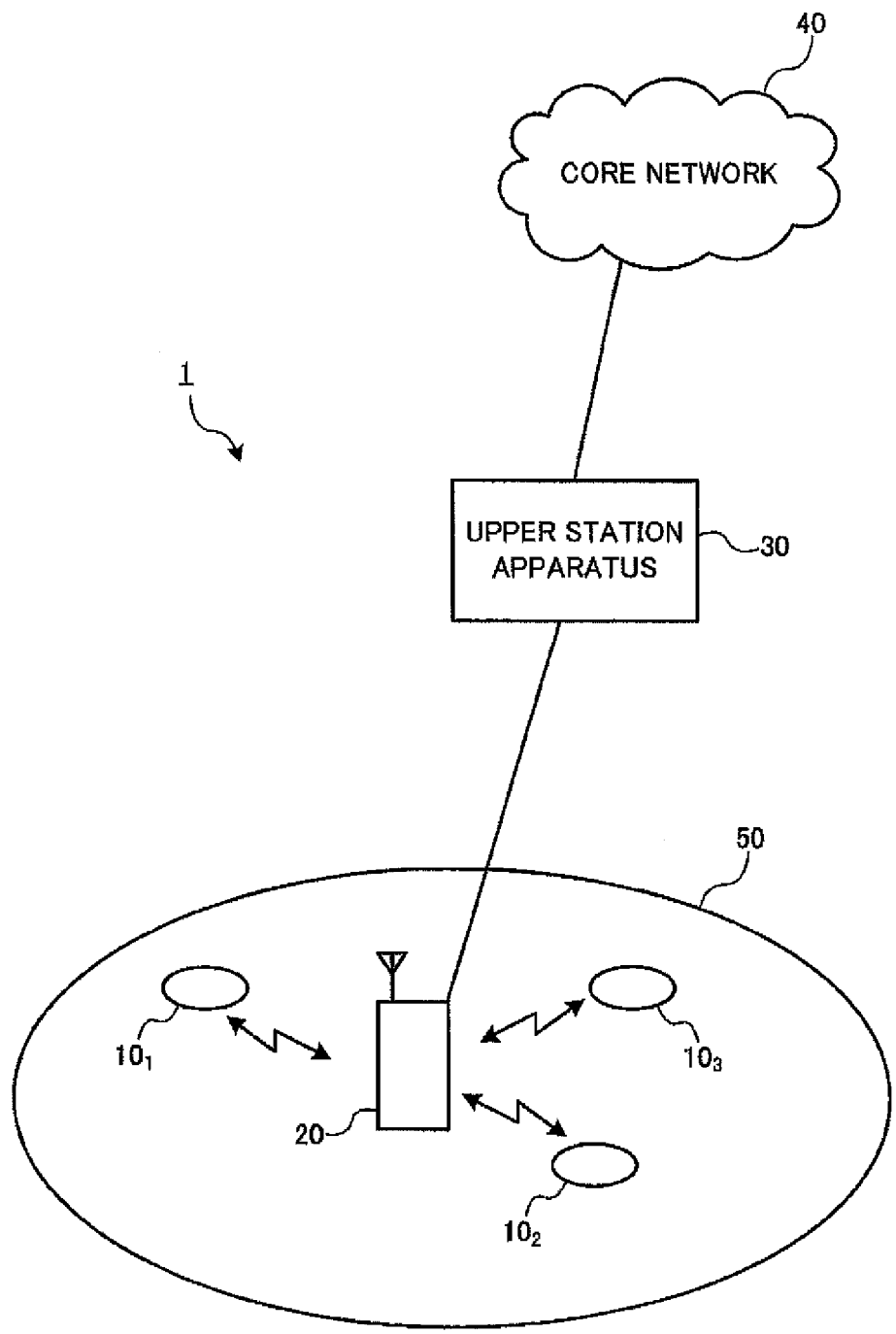
FIG. 6 is a diagram illustrating a schematic configuration of a mobile communication system according to an Embodiment of the invention.

Referring to FIG. 6, described is a mobile communication system 1 having mobile terminal apparatuses (UEs) 10 and base station apparatus (Node B) 20 according to the Embodiment of the invention. FIG. 6 is a diagram to explain a configuration of the mobile communication system 1 having mobile terminal apparatuses 10 and the base station apparatus 20 according to this Embodiment. In addition, the mobile communication system 1 as shown in FIG. 6 is a system including, for example, the LTE system or SUPER 3 G. Further, the mobile communication system 1 may be called IMT-Advanced or may be called 4 G.

As shown in FIG. 6, the mobile communication system 1 includes the base station apparatus 20 and a plurality of mobile terminal apparatuses 10 ($10_1$, $10_2$, $10_3$, . . . , $10_n$, n is an integer where n>0) that communicate with the base station apparatus 20 and is comprised thereof. The base station apparatus 20 is connected to an upper station apparatus 30, and the upper station apparatus 30 is connected to a core network 40. The mobile terminal apparatus 10 communicates with the base station apparatus 20 in a cell 50. In addition, for example, the upper station apparatus 30 includes an access gateway apparatus, radio network controller (RNC), mobility management entity (MME), etc., but is not limited thereto.

Each of the mobile terminal apparatuses 10 ($10_1$, $10_2$, $10_3$, . . . , $10_n$) has the same configuration, function and state, and is described as a mobile terminal apparatus 10 unless otherwise specified in the following description. Further, for convenience in description, the description is given while assuming that equipment that performs radio communication with the base station apparatus 20 is the mobile terminal apparatus 10, and more generally, the equipment may be user equipment (UE) including mobile terminal apparatuses and fixed terminal apparatuses.

In the mobile communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission system for dividing a frequency band into a plurality of narrow frequency bands (subcarriers), and mapping data to each subcarrier to perform communication. SC-FDMA is a single-carrier transmission system for dividing the system band into bands comprised of a single or consecutive resource blocks for each terminal so that a plurality of terminals uses mutually different bands, and thereby reducing interference among the terminals.

Described herein are communication channels in the LTE system. In downlink, used are the PDSCH shared among the mobile terminal apparatuses 10, and downlink L1/L2 control channels (PDCCH, PCFICH and PHICH). On the PDSCH, user data i.e. normal data signals are transmitted. The transmission data is included in the user data. Further, with respect to a CC that the base station apparatus 20 assigns to the mobile terminal apparatus 10 and scheduling information, the CC and information is notified to the mobile terminal apparatus 10 on the L1/L2 control channel.

In uplink, used are the PUSCH shared among the mobile terminal apparatuses 10, and the PUCCH (Physical Uplink Control Channel) that is a control channel in uplink. User data is transmitted on the PUSCH. Meanwhile, on the PUCCH is transmitted radio quality information (CQI: Channel Quality Indicator) in downlink, etc.

Figure 7:
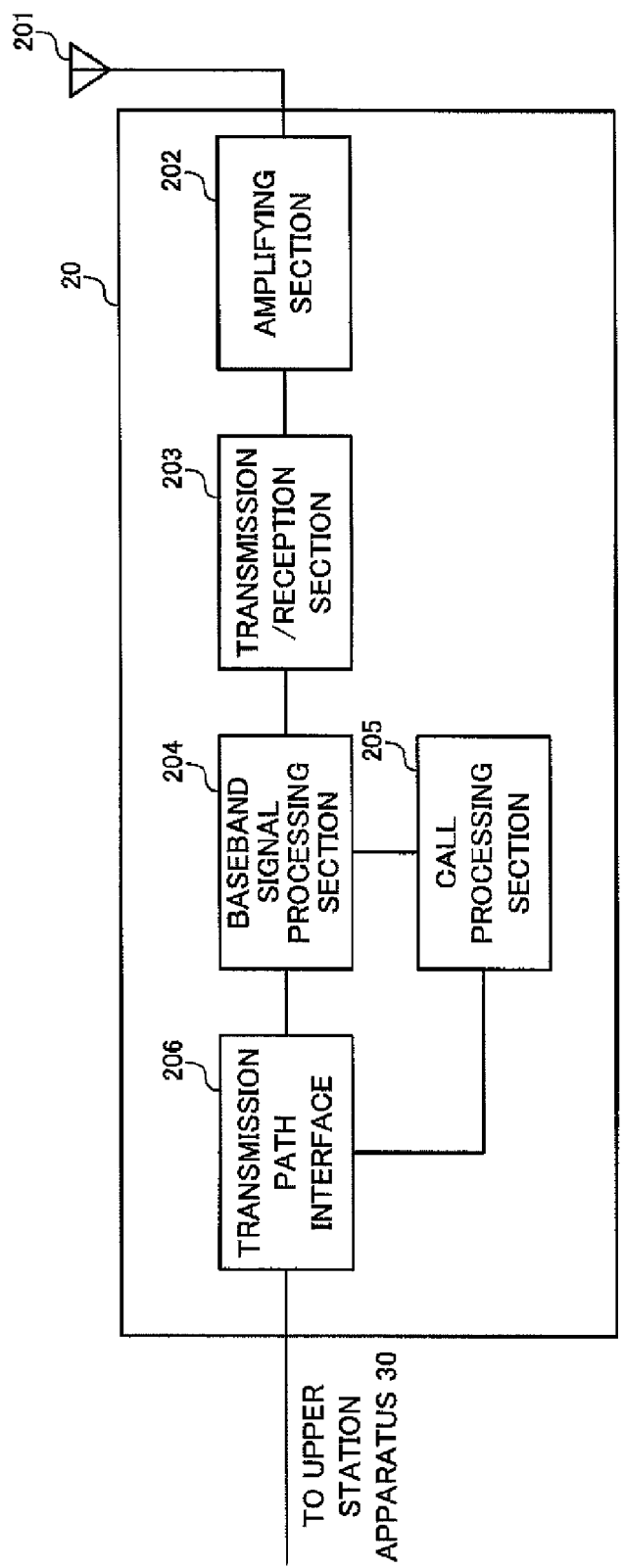
FIG. 7 is a diagram illustrating a schematic configuration of a radio base station apparatus according to the Embodiment of the invention.

Herein, a configuration of the base station apparatus 20 according to this Embodiment will be described with reference to FIG. 7. As shown in FIG. 7, the base station apparatus 20 is provided with a transmission/reception antenna 201, amplifying section 202, transmission/reception section 203, baseband signal processing section 204, call processing section 205 and transmission path interface 206.

The user data transmitted from the base station apparatus 20 to the mobile terminal apparatus 10 in downlink is input to the baseband signal processing section 204 via the transmission path interface 206 from the upper station apparatus 30 positioned higher than the base station apparatus 20.

The baseband signal processing section 204 performs PDCP layer processing, segmentation and concatenation of user data, RLC (Radio Link Control) layer transmission processing such as transmission processing of RLC retransmission control, MAC (Medium Access Control) retransmission control e.g. transmission processing of HARQ (Hybrid Automatic Repeat reQuest), scheduling, transmission format selection, channel coding, Inverse Fast Fourier Transform (IFFT) processing and precoding processing on the data to transfer to the transmission/reception section 203. Further, with respect to signals of the Physical Downlink Control Channel that is a downlink control channel, the transmission processing such as channel coding and Inverse Fast Fourier Transform is performed, and the resultant is transferred to the transmission/reception section 203.

Further, on the above-mentioned broadcast channel, the baseband signal processing section 204 notifies the mobile terminal apparatus 10 of control information for communications in the cell 50. For example, the broadcast information for communications in the cell 50 includes the system bandwidth in uplink or downlink, identification information (Root Sequence Index) of a root sequence to generate a signal of a random access preamble on the PRACH, etc.

The transmission/reception section 203 performs frequency conversion processing for converting the baseband signal output from the baseband signal processing section 204 into a signal with a radio frequency band, and then, the signal is amplified in the amplifying section 202 and transmitted from the transmission/reception antenna 201.

Meanwhile, with respect to signals transmitted from the mobile terminal apparatus 10 to the base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer on the user data included in the input baseband signal, and transfers the resultant to the upper station apparatus 30 via the transmission path interface 206.

The call processing section 205 performs call processing such as setting and release of the communication channel, status management of the base station apparatus 20, and management of radio resources.

Figure 8:
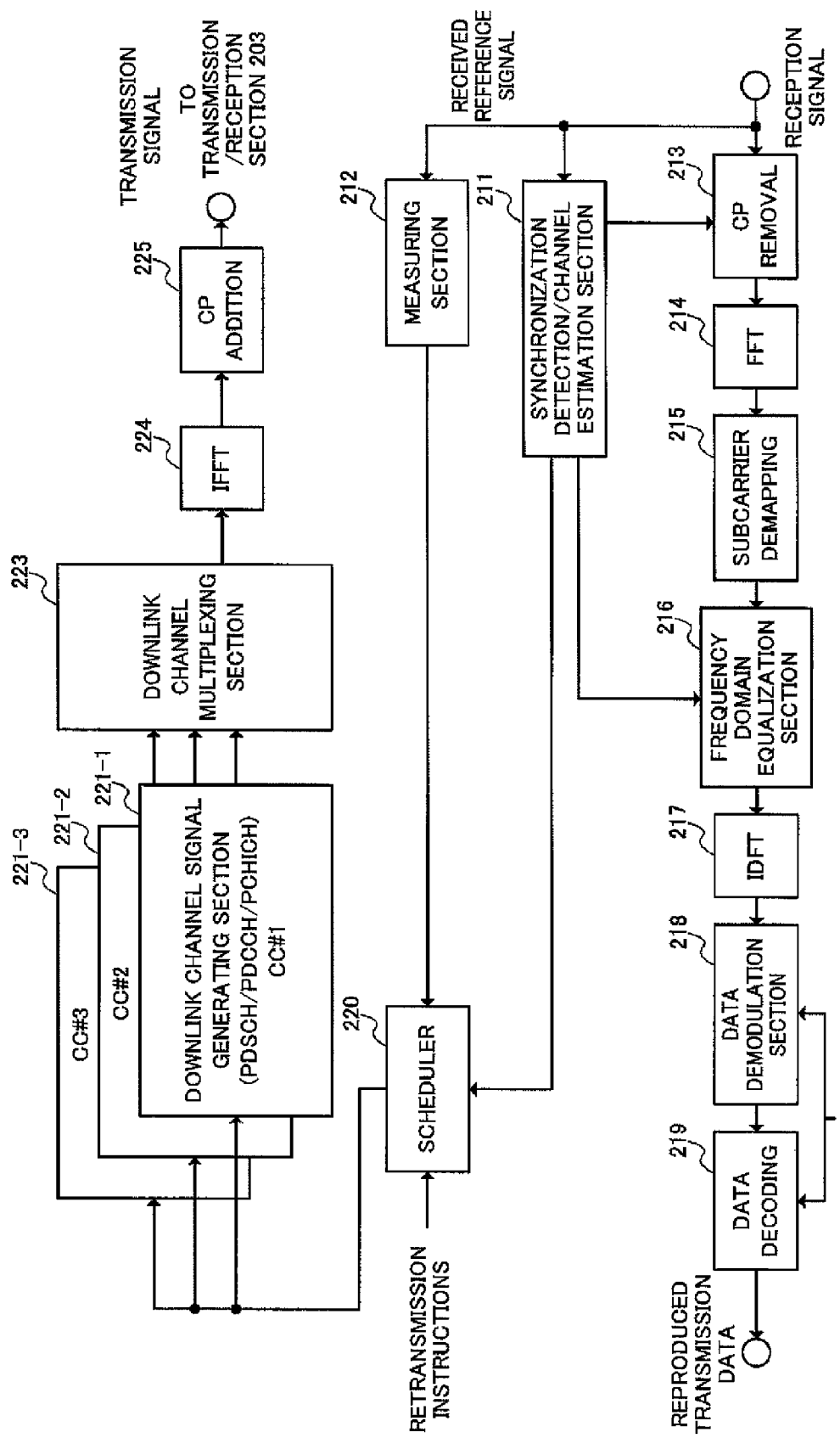
FIG. 8 is a functional block diagram of a baseband processing section in the radio base station apparatus as shown in FIG. 7.
Figure 9:
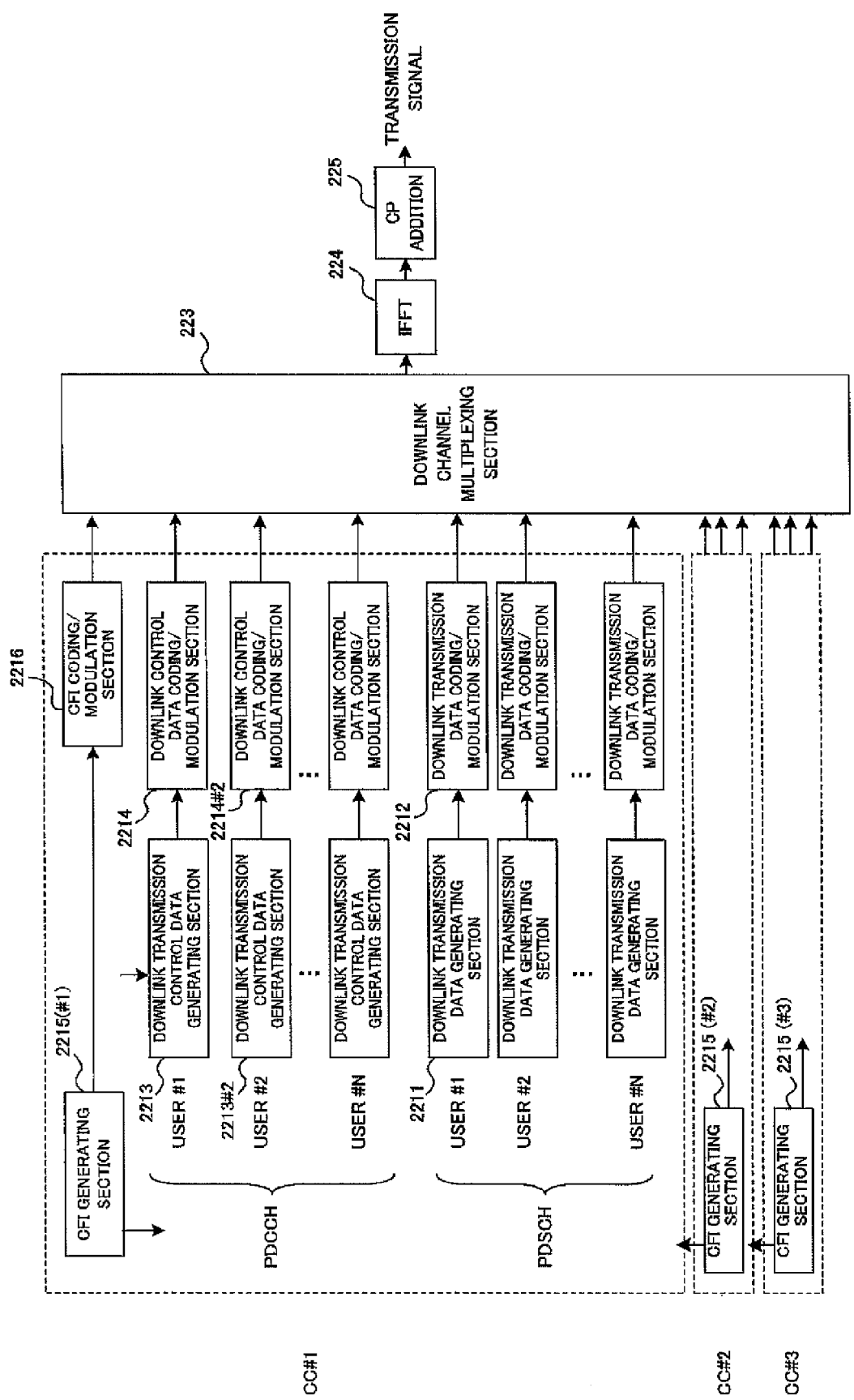
FIG. 9 is a functional block diagram of a transmission processing system in the baseband processing section as shown in FIG. 8.

FIG. 8 is a functional block diagram of the baseband signal processing section 204 of the base station apparatus 20 according to this Embodiment, and FIG. 9 shows functional blocks of a transmission processing section in the baseband signal processing section 204 of the base station apparatus 20. A reference signal included in the reception signal is input to a synchronization detection/channel estimation section 211 and a CQI measuring section 212. The synchronization detection/channel estimation section 211 estimates a channel state in uplink based on the reception state of the reference signal received from the mobile terminal apparatus 10. The CQI measuring section 212 measures a CQI from a quality measurement reference signal received from the mobile terminal apparatus 10.

Meanwhile, with respect to the reception signal input to the baseband signal processing section 204, a CP removal section 213 removes a cyclic prefix that is added to the reception signal, and then, a Fast Fourier Transform section 214 performs Fourier transform on the resultant to transform into information in the frequency domain. The reception signal transformed into the information in the frequency domain is demapped in the frequency domain in a subcarrier demapping section 215. The subcarrier demapping section 215 performs demapping corresponding to mapping in the mobile terminal apparatus 10. A frequency domain equalization section 216 equalizes the reception signal based on a channel estimation value provided from the synchronization detection/channel estimation section 211. An inverse discrete Fourier transform section 217 performs inverse discrete Fourier transform on the reception signal, and restores the signal in the frequency domain to the signal in the time domain. Then, a data demodulation section 218 and data decoding section 219 demodulate and decode the signal based on a transmission format (coding rate, modulation scheme), and the transmission data is reproduced.

A scheduler 220 receives transmission data and retransmission instructions input from the upper station apparatus 30 that processes transmission signals. Further, the scheduler 220 receives the channel estimation value estimated in the synchronization detection/channel estimation section 211 and the CQI of each resource block measured in the CQI measuring section 212. By referring to the retransmission instructions input from the upper station apparatus 30, the channel estimation value and CQI, the scheduler 220 performs scheduling of uplink and downlink control signals and uplink and downlink shared channel signals. In the propagation path in mobile communication, the variation varies with frequencies by frequency selective fading. Therefore, in transmitting user data to user terminals, used is adaptive frequency scheduling for assigning a resource block with good communication quality for each subframe to each user. In adaptive frequency scheduling, with respect to each resource block, a user terminal with good propagation path quality is selected and assigned. Therefore, the scheduler 220 assigns resource blocks using the CQI for each resource block sent from each user terminal as feedback. Further, the scheduler 220 determines MCS (coding rate, modulation scheme) that meets a predetermined block error rate in the assigned resource block.

In this Embodiment, the transmission processing system of the baseband signal processing section 204 is configured to be able to adapt to three component carriers, CC#1 to CC#3, and is provided with three downlink channel signal generating sections, 221-1 to 221-3, in associated with respective component carriers CC#1 to CC#3. Further, the system is configured to be able to accommodate maximum N users (user #1 to user #N). FIG. 9 shows the PDSCH, PDCCH and PCFICH as downlink channels related to the invention, but other channels are included actually.

A downlink transmission data generating section 2211 generates a downlink shared channel signal using the transmission data from the upper station apparatus 30. The transmission data generated in the downlink transmission data generating section 2211 is coded and then modulated in a downlink transmission data coding/modulation section 2212. The information (MCS) of the coding method and modulation scheme for the transmission data is given to the downlink transmission data coding/modulation section 2212 from the scheduler 220. Also for the other users #2 to #N assigned to the same component carrier CC#1, downlink transmission data generating sections 2211 and downlink transmission data coding/modulation sections 2212 are provided similarly. A signal of the PDSCH is generated for each of component carriers CC#1 to CC#3.

A downlink transmission control data generating section 2213 generates a downlink control signal (DCI) from the resource assignment information determined for each user, MCS information, information for HARQ, transmission power control command of the PUCCH, etc. The downlink control signal (DCI) generated in the downlink transmission control data generating section 2213 is coded and then modulated in a downlink control data coding/modulation section 2214. The DCI structure of the downlink control information generated in the downlink transmission control data generating section 2213 includes the PCFICH field (CFI value) as shown in FIG. 4(B). The coding/modulation processing of the downlink control information with the PCFICH field added will be described later. Also for the other users #2 to #N assigned to the same component carrier CC#1, downlink transmission control data generating sections 2213 and downlink control data coding/modulation sections 2214 are provided similarly. The downlink control information (DCI) notified on the PDCCH is generated for each of component carriers CC#1 to CC#3.

A CFI generating section 2215 generates a 2-bit CFI value indicative of the number of assigned symbols, based on the number of OFDM symbols (control channel region) assigned to the downlink control channel determined in the scheduler 220. For example, the CFI generating section 2215 of component carrier CC#1 generates a 2-bit CFI value for each subframe as shown in FIG. 3. The CFI value generated in the CFI generating section 2215 is coded and then modulated in a CFI coding/modulation section 2216.

Further, when scheduling is performed so as to transmit a PDSCH and the PDCCH for the PDSCH with different component carriers, the CFI value generated in the CFI generating section 2215 for one component carrier to transmit the PDSCH is given to the downlink transmission control data generating section 2213 for the other component carrier to transmit the PDCCH. For example, such scheduling corresponds to the case where the PDSCH is assigned to component carrier #2, and the PDCCH is assigned to the different component carrier #1, in transmitting user data to user #2. When such resource assignment is performed, the CFI value indicative of the control channel region in which the PDCCH and the like are arranged is generated in the CFI generating section 2215#2 for component carrier CC#2. Therefore, the CFI value generated in the CFI generating section 2215#2 for component carrier CC#2 is given to the downlink transmission control data generating section 2213#2 associated with the user #2 in component carrier CC#2.

A downlink channel multiplexing section 223 multiplexes (may include time, frequency region and code multiplexing) signals of respective channels output from the coding/modulation sections 2212, 2214 and 2216 for each of component carriers CC#1 to CC#3.

A downlink channel signal multiplexed in the downlink channel multiplexing section 223 undergoes inverse fast Fourier transform in the inverse fast Fourier transform section 224, and is transformed from the signal in the frequency domain to the time-series signal, and then, a cyclic prefix adding section (CP adding section) 225 adds a cyclic prefix to the signal. In addition, the cyclic prefix functions as guard interval to absorb the difference in multipath propagation delay. The transmission data with the cyclic prefix added is output to the transmission/reception section 203.

Figure 10:
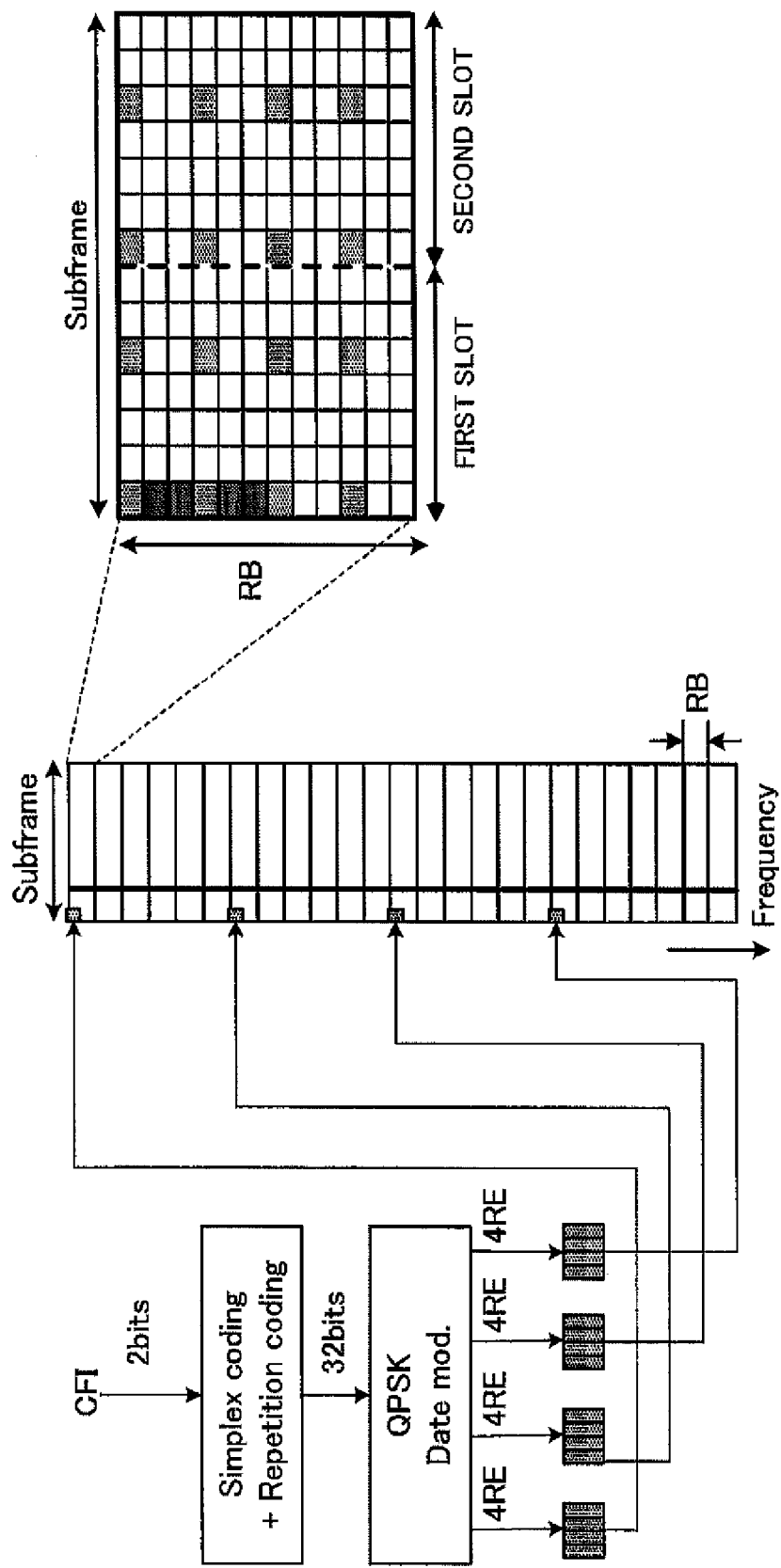
FIG. 10 is a diagram illustrating content of processing until a CFI value is assigned to a subframe.

Herein, the content of processing until the CFI value is assigned to a subframe will be described with reference to FIG. 10. As described above, on the PCFICH, the number of OFDM symbols indicative of the PDCCH assignment region in one subframe is notified as 2-bit information (CFI value). The scheduler 220 selects an optimal CFI value corresponding to the cell radius, the number of held users, etc. to notify the CFI generating section 2215. The CFI generating section 2215 transforms the number of OFDM symbols indicative of the assignment region of the downlink control channel directed from the scheduler 220 into a 2-bit CFI value. The CFI coding/modulation section 2216 executes the following processing. In other words, the section 2216 scrambles the 2-bit CFI value to 32-bit coded data by simplex coding bit repetition. Thus generated 16 QPSK symbols are mapped to four REGs (Resource Element Groups). Four resource elements form one REG, and one resource element is comprised of one subcarrier × 1 OFDM symbol. Each REG is allocated equally in the entire system band with the frequency diversity effect anticipated. In addition, one subframe is comprised of first and second slots in the time domain, and one slot is comprised of 7 OFDM symbols. Further, one subframe is comprised of 12 resource blocks (RBs) in the frequency domain, and one resource block is comprised of 12 subcarriers (180 kHz). As shown in FIG. 10, in each subframe to which the CFI is mapped, the CFI information (segment) is allocated in the first OFDM symbol of the first slot.

In the LTE system, as described above, the CFI value is allocated and transmitted in the first OFDM symbol of the first slot in each subframe. In this Embodiment, when the PDSCH and the PDCCH for the PDSCH are transmitted with different component carriers, the CFI value is given to the downlink transmission control data generating section 2213 for the component carrier to transmit the PDCCH, is incorporated into the DCI information and transmitted.

Herein, to actualize the DCI structure including the CFI value, masking with the CFI value is performed as shown in FIG. 5(B), and further, the structure as shown in FIG. 4(B) may be adopted by adding a PCFICH field (CFI value) to the DCI structure.

Figure 11:
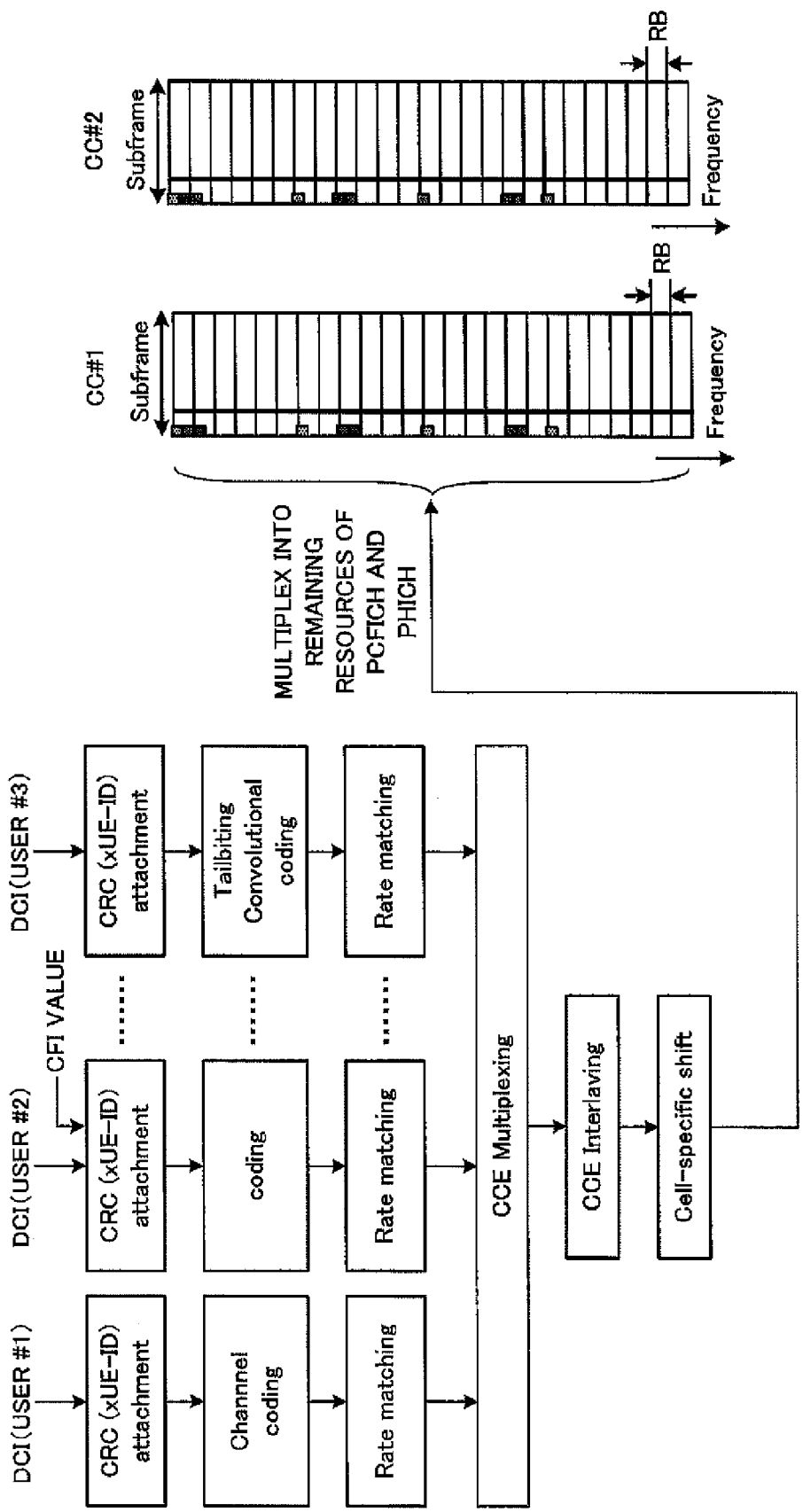
FIG. 11 is a diagram illustrating content of processing until a DCI structure is mapped in the frequency domain.
Figure 12:
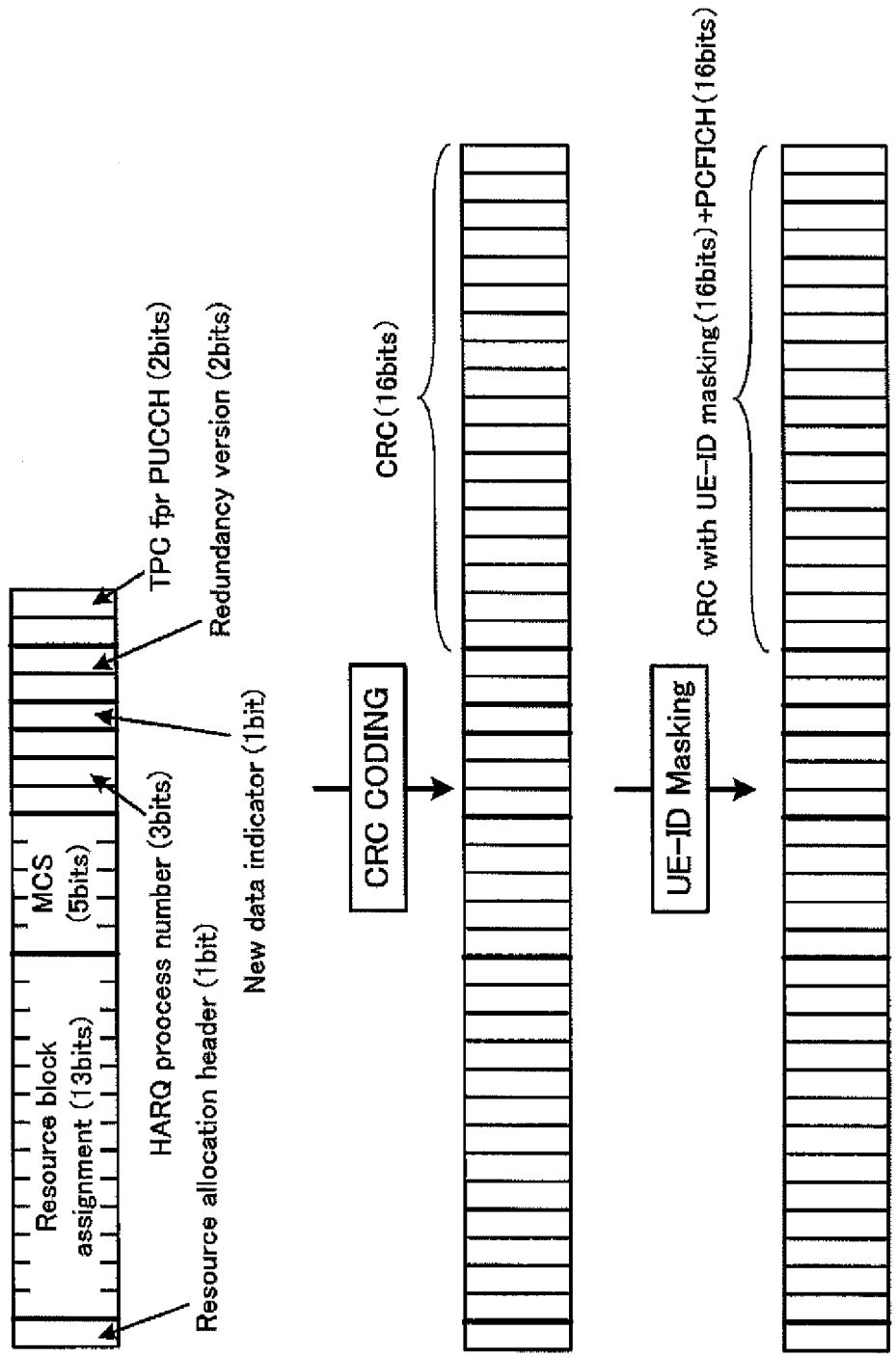
FIG. 12 is a process diagram that associates the content of processing until a DCI structure is mapped in the frequency domain with the DCI structure.

Referring to FIGS. 11 and 12, described is the processing until the DCI structure including the CFI value is mapped in the frequency domain. In an example as shown in FIG. 11, the PDSCH to transmit the user data of user #2 is assigned the component carrier CC#2, and the PDCCH for transmitting the downlink control information of the PDSCH is assigned the different component carrier CC#1. In this case, the downlink transmission control data generating section 2213#2 for component carrier CC#1 generates the DCI information for user #2 (see FIG. 9). Accordingly, the CFI value to be incorporated into the DCI structure is delivered from the CFI generating section 2215#2 for component carrier CC#2 to the downlink transmission control data generating section 2213#2 or downlink control data coding/modulation section 2214#2 for component carrier CC#1. In the case of masking the CRC code with the CFI value, the CFI value may be delivered to the downlink control data coding/modulation section 2214#2, but in the case of adding the PCFICH (CFI value) field to the DCI structure, the CFI value is delivered to the downlink transmission control data generating section 2213#2.

The downlink control data coding/modulation section 2214#2 performs data coding and modulation processing as shown in FIGS. 11 and 12. In other words, the section adds a 16-bit CRC code to the DCI, and masks the CRC code with a 16-bit user identifier (UE-ID) and the CFI value (see FIG. 12). The masking-processed DCI is coded with a code corresponding to the coding rate, and rate matching is performed so that the PDCCH is of the predetermined number of bits. For PDCCHs of the other users, coding of DCI and rate matching is performed. In addition, for users such that the PDSCH and PDCCH are transmitted with the same component carrier, the processing for including the CFI information in the DCI structure is not performed.

Transmission of the PDCCH is performed on a basis of CCE (Control Channel Element) comprised of 36 symbols. The scheduler 220 of the base station apparatus 20 controls the number of assigned CCEs for each of users #1 to #N, and is thereby capable of controlling the coding rate. The scheduler 220 decreases the number of assigned CCEs for users such as users existing in the cell edge that require the high coding rate. Meanwhile, the scheduler 220 increases the number of assigned CCEs for users that require the low coding rate. After combining all the PDCCHs in a serial manner and multiplexing, the resultant is interleaved on a CCE basis. Further, scrambling is performed with a cell specific sequence, and the resultant is mapped to QPSK symbols. The resultant is collected every four symbols, and mapped to the REG in a predetermined order.

In this way, the PDCCH that is the control information of the PDSCH transmitted with the component carrier #2 is transmitted with the different component carrier #1 while including the CFI value.

Figure 13:
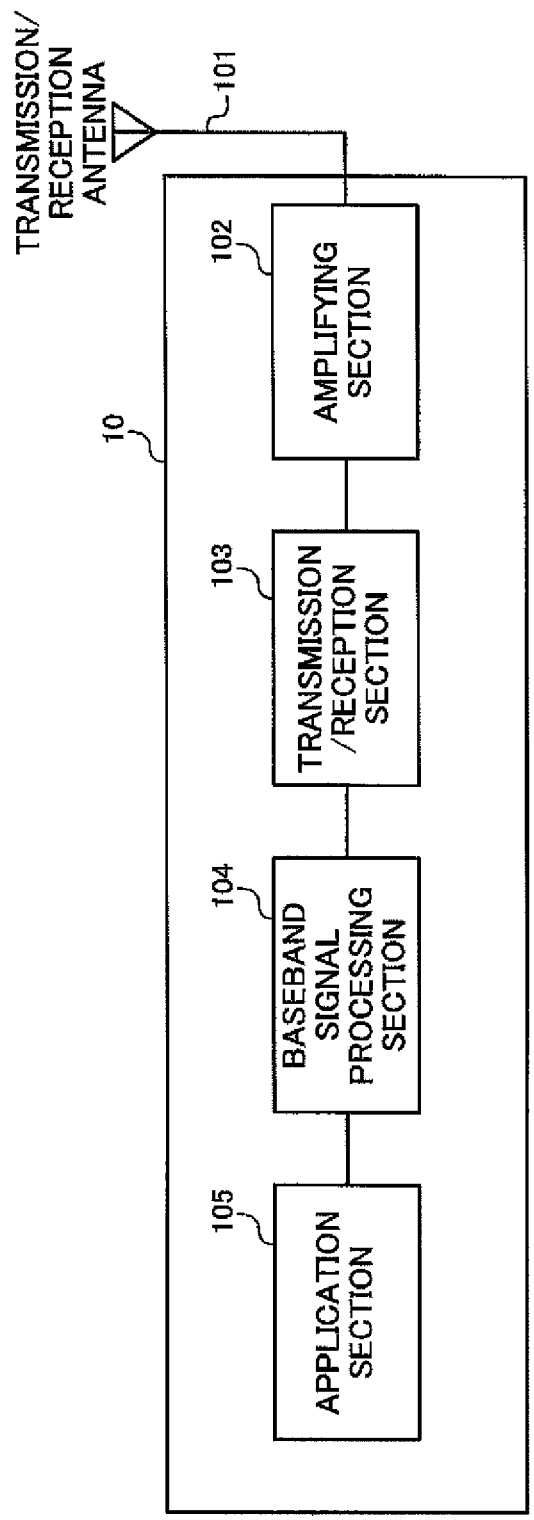
FIG. 13 is a diagram illustrating a schematic configuration of a mobile terminal apparatus according the Embodiment of the invention.

Referring to FIG. 13, described next is a configuration of the mobile terminal apparatus 10 according to this Embodiment. The mobile terminal apparatus 10 is provided with a transmission/reception antenna 101, amplifying section 102, transmission/reception section 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, user data in downlink is transferred to the application section 105. The application section 105 performs processing concerning layers higher than the physical layer and MAC layer and the like. Further, among the data in downlink, broadcast information is also transferred to the application section 105.

Meanwhile, the application section 105 inputs user data in uplink to the baseband signal processing section 104. The baseband signal processing section 104 performs transmission processing of retransmission control (H-ARQ (Hybrid ARQ)) channel coding, DFT processing, IFFT processing, etc. on the data to transfer to the transmission/reception section 103. The transmission/reception section 103 performs frequency conversion processing for converting the baseband signal output from the baseband signal processing section 104 into a signal with a radio frequency band, and then, the signal is amplified in the amplifying section 102, and is transmitted from the transmission/reception antenna 101.

Figure 14:
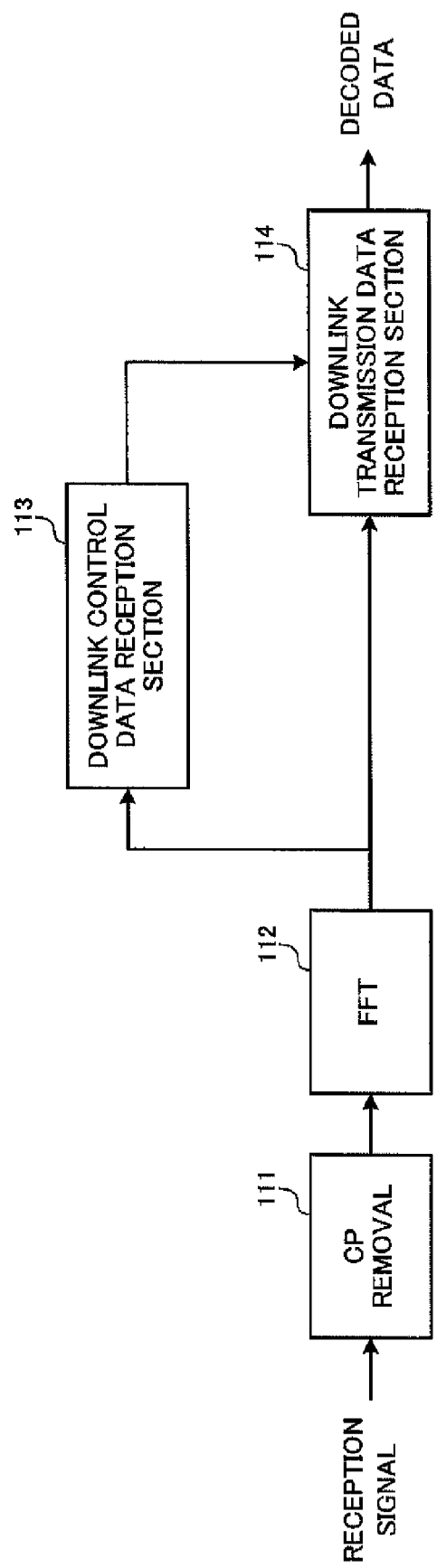
FIG. 14 is a functional block diagram of a baseband processing section of the mobile terminal apparatus as shown in FIG. 13.

FIG. 14 is a functional block diagram of the baseband signal processing section 104 of the mobile terminal apparatus 10 according to this Embodiment, and shows a reception processing system. A reception signal output from the transmission/reception section 103 is input to a CP removing section 111. The CP removing section ill removes a cyclic prefix that is a guard interval from the reception signal. The reception signal (OFDM signal) from which the cyclic prefix is removed undergoes fast Fourier transform in a fast Fourier transform section (FFT) 112, and is transformed from a waveform of time component into an orthogonal multicarrier signal of frequency component. A downlink control data reception section 113 demodulates a signal of the downlink control channel. Based on the downlink control information, a downlink transmission data reception section 114 demodulates a signal of the downlink shared channel.

The mobile terminal apparatus 10 is capable of performing communications using the system band comprised of a plurality of component carriers. The downlink control data reception section 113 decodes respective PCFICHs from all the received component carriers, and obtains CFI values from the decoded PCFICHs. The apparatus 10 decodes the PDCCH transmitted with each component carrier using the CFI values obtained from all the component carriers. In the PDCCH, the CRC code added to the DCI on the transmission side is masked using the user identifier (UE-ID). The downlink control data reception section 113 cancels masking of the CRC code portion using the user identifier (UE-ID), and checks whether the DCI is transmitted without error by the CRC code. As a result, when the section confirms that the DCI does not have any error, the PDCCH is capable of being received without error.

Herein, when the radio base station 20 assigns different component carriers to the PDSCH and the PDCCH in transmitting user data to the mobile terminal apparatus 10, the DCI structure transmitted on the PDCCH includes the CFI value. When the CFI is notified by the method as shown in FIG. 4(B), the PCFICH field is added to the DCI. The apparatus 10 is capable of obtaining the CFI value from the PCFICH field added to the DCI. When the PDCCH is capable of being received without error, the CFI value obtained from the PCFICH field is also capable of being received without error. Meanwhile, when the CFI is notified by the method as shown in FIG. 5(B), the CRC portion added to the DCI is masked with the known user identifier and the CFI value. Accordingly, the masked CRC portion and the known CRC code are exclusively ORed, and the mask generated from the exclusive OR between the user identifier (UE-ID) and the CFI value is restored. The CFI vale is obtained further from an exclusive OR between the restored mask and the known user identifier (UE-ID).

When different component carriers are assigned to the PDSCH and the PDCCH, the CFI value included in the DCI structure is extracted as described above, and the CFI value is given to the downlink transmission data reception section 114. The downlink transmission data reception section 114 detects the data region (starting position of the PDSCH in the subframe) based on the CFI value obtained in the downlink control data reception section 113, and starts acquisition of the user data from the starting position of the PDSCH.

Figure 15:
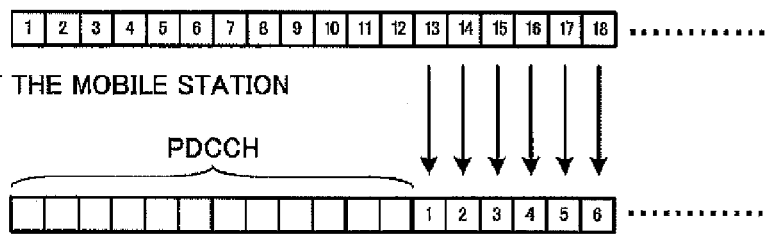
FIG. 15 is a diagram to explain the effect of PCFICH error.

Referring to FIG. 15, described is why it is possible to prevent the occurrence of the defect such that the retransmission failure is repeated in the mobile terminal apparatus 10 when the PCFICH is erroneous.

FIG. 15 exemplifies a case that the mobile station erroneously recognizes that CFI=2 although the CFI value notified on the PCFICH is CFI=1 in some subframe. At this point, the PDCCH that is the control information of the PDSCH (transmission signal) is transmitted with a component carrier different from that of the PDSCH.

The mobile station erroneously recognizes that the third symbol of the first slot is the starting position of the PDSCH. Meanwhile, it is assumed that any error does not occur in the PDCCH that is transmitted with the different component carrier from that of the PDSCH. The mobile station recognizes the 13rd of the original transmission data sequence as the first from the erroneous CFI value. In this case, since the error is detected by error check, the mobile station stores the shifted sequence in a reception buffer and requests retransmission. Then, since the mobile station combines the retransmitted data and the data in the reception buffer, the result is that the error is detected again. As a result, waste that the retransmission request is repeated occurs.

According to this Embodiment, when different component carriers are assigned to the PDSCH and the PDCCH, since the DCI notified on the PDCCH includes the CFI value, when the PDCCH is received without error, any error does not occur in the CFI value that is included and transmitted in the DCI. Accordingly, when the starting position of the PDSCH is detected using the CFI value, it is possible to prevent wasteful retransmission from being repeated.

Then, when different component carriers are assigned to the PDSCH and the PDCCH, it is necessary to notify the mobile station of the carrier number of the original component carrier of the PDCCH. The invention is not limited particularly in the method of notifying of the carrier number of the original component carrier of the PDCCH. It is only essential that the mobile station is capable of recognizing that the PDCCH received from some component carrier is of the component carrier.

Described next is a DCI structure suitable for including the CFI value and the carrier number of the original component carrier in the DCI of the PDCCH assigned to another component carrier.

Figure 16:
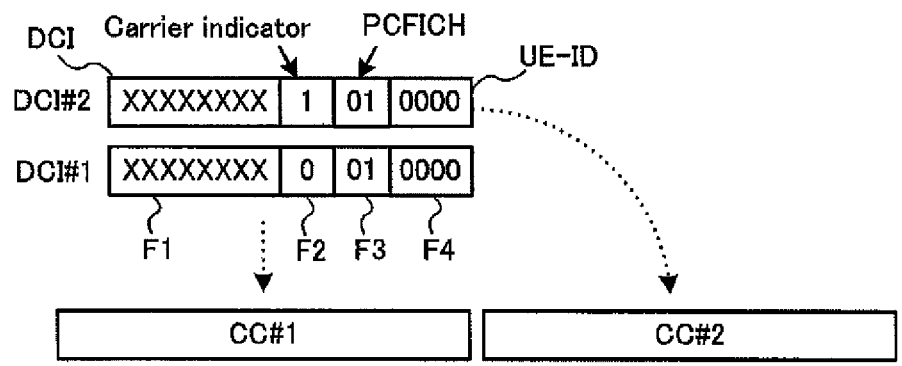
FIG. 16 is a diagram illustrating a DCI structure provided with an additional field for a CFI value and carrier number.

FIG. 16 shows a DCI structure provided with additional fields for the CFI value and the carrier number of the component carrier. The DCI structure as shown in FIG. 16 has a DCI field F1, carrier identification field (Carrier indicator) F2, PCFICH field F3, and user identification field F4. The DCI field F1 is set for the control information of DCI defined in LTE (FIG. 4(A)). The carrier identification field F2 is set for the carrier number of the original component carrier assigned to the PDSCH associated with the PDCCH by one bit. The PCFICH field F3 is set for the CFI value of the PCFICH by two bits. The user identification field F4 is set for the user identifier (UE-ID) of the mobile station that is a reception destination of the user data transmitted on the PDSCH by four bits. To ensure backward compatibility with LTE, in the user identification field F4, the CRC portion is masked with the user identifier (UE-ID). The CRC code as shown in FIG. 5(A) is of 16 bits, but herein, shown by 4 bits for convenience in description.

When the carrier identification field F2 is of a 1-bit width, it is possible to distinguish between two component carriers. As a method of indicating the carrier number, an absolute indication method or relative indication method is applicable. The absolute indication method indicates the component carrier CC#1 in carrier identification field=0 in a fixed manner, while indicating the component carrier CC#2 in carrier identification field=1 in a fixed manner. The relative indication method indicates an original component carrier (for example, CC#1) in carrier identification field=0, while indicating a component carrier (for example, CC#2) of the number that is relatively increased or decreased from the original component carrier (CC#1) in carrier identification field=1. Further, when the PCFICH is of a 2-bit width, it is possible to set the CFI value at 1, 2, 3 or 4. In the DCI structure as shown in FIG. 16, the user identification field F4 is provided separately from the DCI field F1.

DCI#1 indicates the DCI structure in the case where the same component carrier is assigned to the PDSCH and the PDCCH. DCI#2 indicates the DCI structure in the case where different component carriers are assigned to the PDSCH and the PDCCH.

The mobile station obtains DCI#1, DCI#2 as a result of decoding the PDCCH, is thereby capable of identifying the component carrier to which the DCI belongs from the bit value of the carrier identification field F2, and is thus capable of obtaining the CFI value also.

Further, by providing the same structure for the DCI structure (DCI #1) in the case where the same component carrier is assigned to the PDSCH and the PDCCH and the DCI structure (DCI #2) in the case where different component carriers are assigned to the PDSCH and the PDCCH, it is possible to fix the bit length of the DCI.

Figure 17:
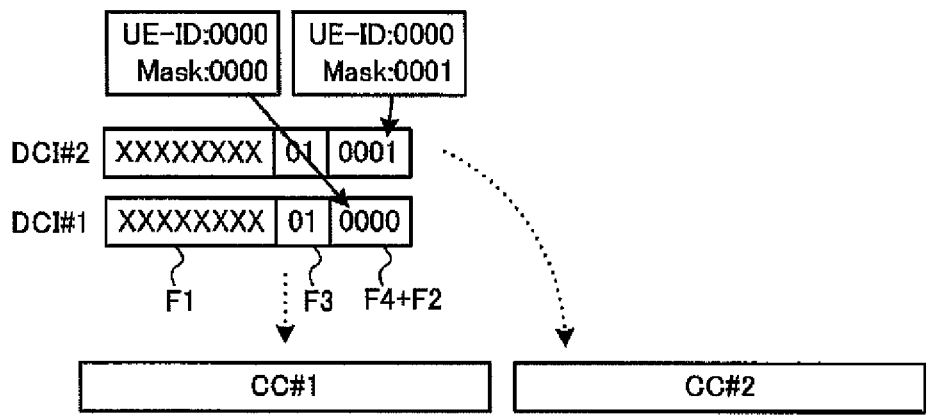
FIG. 17 is a diagram illustrating a DCI structure with a user identification field masked with the carrier number.

FIG. 17 shows the DCI structure with the user identification field masked with the carrier number. In the DCI structure as shown in FIG. 17 is deleted the carrier identification field F2 which is individually provided in the DCI structure as shown in FIG. 16. The carrier number is represented by the same number of bits as the user identifier (UE-ID), and the user identifier (UE-ID) of the user identification field F4 is masked with the carrier number.

The absolute identification method or the relative identification method is also applicable to the method for indicating the mask number (carrier number) to mask the user identifier (UE-ID) of the user identification field F4. The absolute indication method indicates the component carrier CC#1 in the mask number=0000 in a fixed manner, while indicating the component carrier CC#2 in the mask number=0001 in a fixed manner. The relative indication method indicates an original component carrier (for example, CC#1) in the mask number=0000, while indicating a component carrier (for example, CC#2) of the number that is relatively increased or decreased from the original component carrier (CC#1) in the mask number=0001.

When the mobile station obtains the DCI#2 by decoding the PDCCH, the mobile station performs an exclusive OR operation between the user identification field F4 and the user identifier (UE-ID), and acquires the carrier number.

The carrier number of each of component carriers CC#1 and CC#2 used in masking of the user identifier (UE-ID) is signaled from the base station to the mobile station. Alternatively, the carrier number of each component carrier may be beforehand determined to be the common number (mask), so that the carrier number (mask) of the different component carrier CC#2 is signaled when different component carriers are assigned to the PDSCH and the PDCCH.

Figure 18:
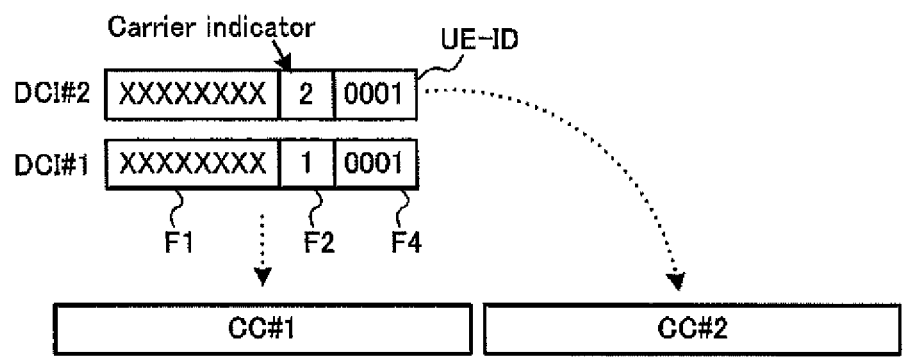
FIG. 18 is a diagram illustrating a DCI structure provided with an additional field for the carrier number.

FIG. 18 shows the DCI structure provided with an additional field for the carrier number of the component carrier. The DCI structure shown in FIG. 18 has the DCI field F1, carrier identification field (Carrier indicator) F2, and user identification field F4. The DCI field F1 is set for the control information of DCI defined in LTE (FIG. 4(A)). The carrier identification field F2 is set for the carrier number of the original component carrier assigned to the PDSCH associated with the PDCCH by one bit. The user identification field F4 is set for the user identifier (UE-ID) of the mobile station that is a reception destination of the user data transmitted on the PDSCH by four bits. To ensure backward compatibility with LTE, in the user identification field F4, the CRC portion is masked with the user identifier (UE-ID). The CRC code as shown in FIG. 5(A) is of 16 bits, but herein, shown by 4 bits for convenience in description.

When the carrier identification field F2 is of a 1-bit width, it is possible to distinguish between two component carriers.

Figure 20:
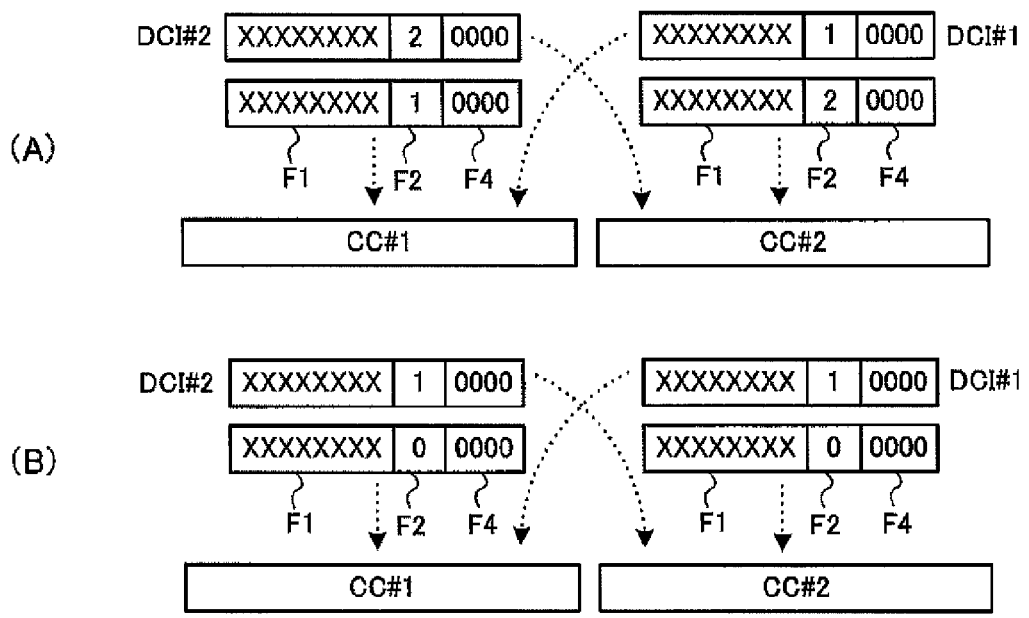
FIG. 20(A) is a diagram illustrating an absolute indication method in the DCI structure as shown in FIG. 18.
FIG. 20(B) is a diagram illustrating a relative indication method in the DCI structure as shown in FIG. 18.

As a method of indicating the carrier number, an absolute indication method or relative indication method is applicable. In the absolute identification method, as shown in FIG. 20(A), for example, the carrier identification field is set for the component carrier number. In FIG. 20(A), the component carrier CC#1 is indicated in carrier identification field=1 in a fixed manner, while the component carrier CC#2 is indicated in carrier identification field=2 in a fixed manner. As shown in FIG. 20(B), the relative indication method indicates an original component carrier (for example, CC#1) in carrier identification field=0, while indicating a component carrier (for example, CC#2) of the number that is relatively increased or decreased from the original component carrier (CC#1) in carrier identification field=1. In the DC1 structure as shown in FIG. 18, the user identification field F4 is provided separately from the DCI field F1.

DCI#1 indicates the DCI structure in the case where the same component carrier is assigned to the PDSCH and the PDCCH. DCI#2 indicates the DCI structure in the case where different component carriers are assigned to the PDSCH and the PDCCH.

The mobile station obtains DCI#1, DCI#2 as a result of decoding the PDCCH, and is thereby capable of identifying the component carrier to which the DCI belongs from the bit value of the carrier identification field F2.

Further, by providing the same structure for the DCI structure (DCI #1) in the case where the same component carrier is assigned to the PDSCH and the PDCCH and the DCI structure (DCI #2) in the case where different component carriers are assigned to the PDSCH and the PDCCH, it is possible to fix the bit length of the DCI.

Figure 19:
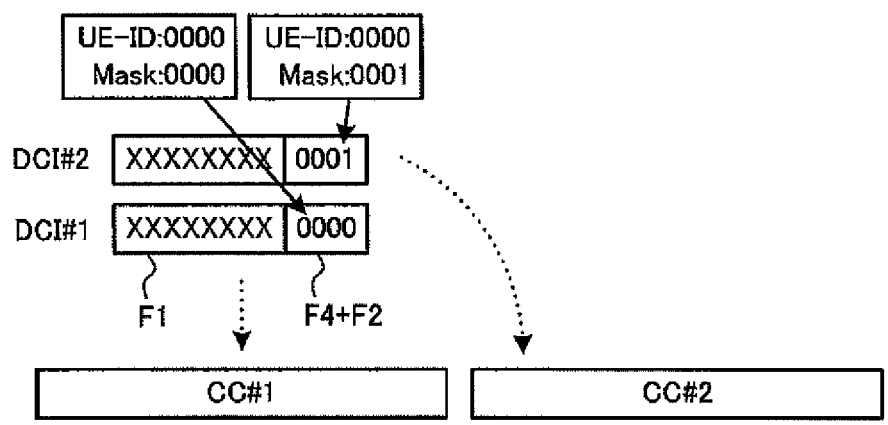
FIG. 19 is a diagram illustrating a DCI structure with the user identification field masked with the carrier number.

FIG. 19 shows the DCI structure with the user identification field masked with the carrier number. In the DCI structure as shown in FIG. 19 is deleted the carrier identification field F2 which is individually provided in the DCI structure as shown in FIG. 18. The carrier number is represented by the same number of bits as the user identifier (UE-ID), and the user identifier (UE-ID) of the user identification field F4 is masked with the carrier number.

Figure 21:
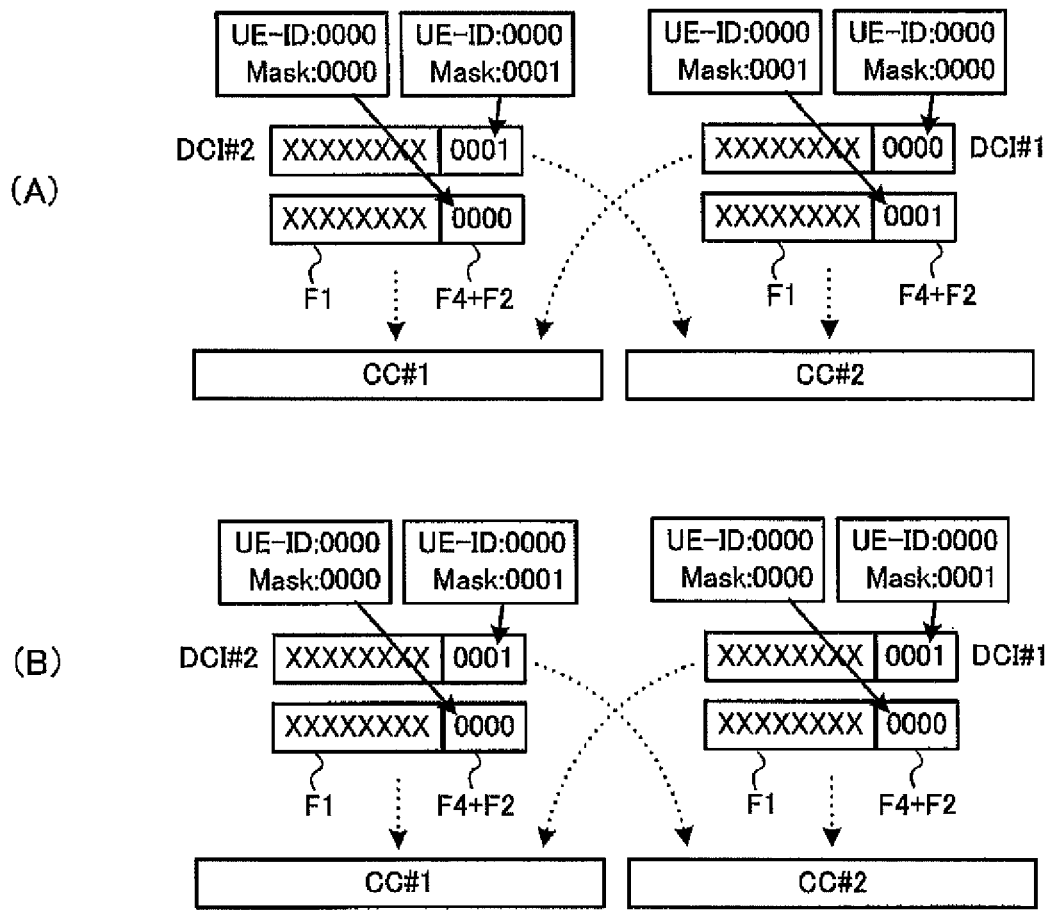
FIG. 21(A) is a diagram illustrating an absolute indication method in the DCI structure as shown in FIG. 19.
FIG. 21(B) is a diagram illustrating a relative indication method in the DCI structure as shown in FIG. 19.

The absolute identification method or the relative identification method is also applicable to the method for indicating the mask number (carrier number) to mask the user identifier (UE-ID) OF the user identification field F4. In the absolute indication method, as shown in FIG. 21(A), for example, the mask number is set at the component carrier number. In FIG. 21(A), the component carrier CC#1 is indicated in the mask number=0000 in a fixed manner, while the component carrier CC#2 is indicated in the mask number=0001 in a fixed manner. In the relative indication method, for example, as shown in FIG. 21(B) an original component carrier (for example, CC#1) is indicated in the mask number=0000, while a component carrier (for example, CC#2) of the number that is relatively increased or decreased from the original component carrier (CC#1) is indicated in the mask number=0001.

When the mobile station obtains the DCI#2 by decoding the PDCCH, the mobile station performs an exclusive OR operation between the user identification field F4 and the user identifier (UE-ID), and acquires the carrier number.

The carrier number of each of component carriers CC#1 and CC#2 used in masking of the user identifier (UE-ID) is signaled from the base station to the mobile station. Alternatively, the carrier number of each component carrier may be beforehand determined to be the common number (mask), so that the carrier number (mask) of the different component carrier CC#2 is signaled when different component carriers are assigned to the PDSCH and the PDCCH.

Figure 22:
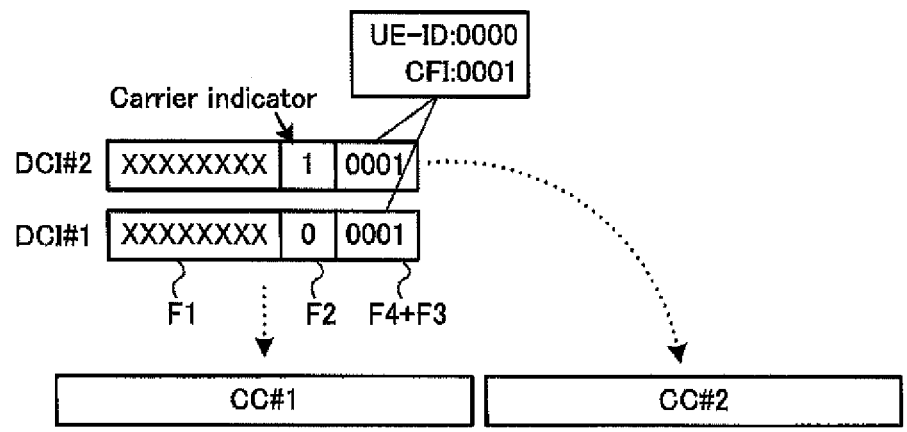
FIG. 22 is diagram illustrating a DCI structure with the user identification field masked with a CFI value.

FIG. 22 shows the DCI structure with the user identification field masked with the CFI value. In the DCI structure as shown in FIG. 22 is deleted the PCFICH field F3 which is individually provided in the DCI structure as shown in FIG. 16. The CFI value is represented by the same number of bits as the user identifier (UE-ID), and the user identifier (UE-ID) of the user identification field F4 is masked with the CFI value.

When the mobile station obtains the DCI#2 by decoding the PDCCH, the carrier identification field F2 is set for the carrier number of the different component carrier CC#2. In this case, the mobile station performs an exclusive OR operation between the user identification field F4 of DCI#2 and the user identifier (UE-ID), and acquires the CFI value.

Figure 23:
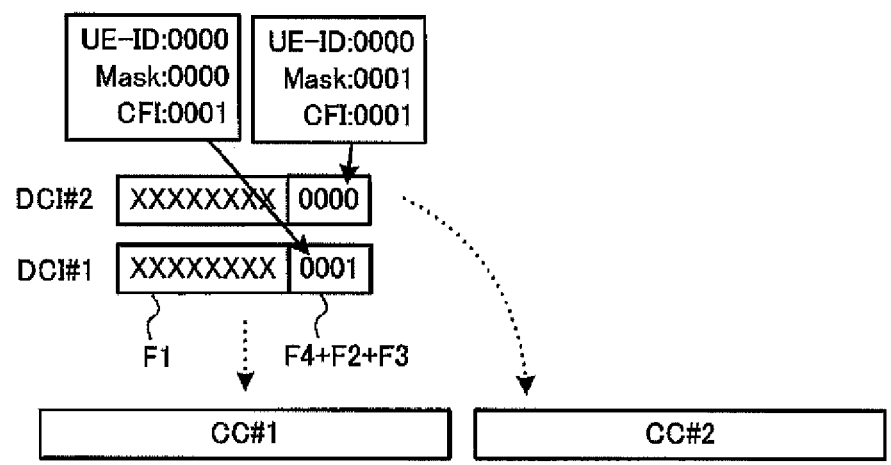
FIG. 23 is diagram illustrating a DCI structure with the user identification field masked with the CFI value and carrier number.

FIG. 23 shows the DCI structure with the user identification field masked with the CFI value and the carrier number. In the DCI structure as shown in FIG. 23 are deleted the carrier identification field F2 and the PCFICH field F3 which are individually provided in the DCI structure as shown in FIG. 16. Each of the carrier number and the CFI value is formed by the same bit-length as the user identifier (UE-ID), and the user identifier (UE-ID) of the user identification field F4 is masked with the carrier number, and is further masked with the CFI value.

When the mobile station obtains the DCI#2 by decoding the PDCCH, the mobile station performs an exclusive OR operation between the user identification field F4 of the DCI#2 and the user identifier (UE-ID), and further, performs an exclusive OR operation between the operation result and the CFI value. By this means, the mobile station obtains the CFI value the carrier number.

In addition, in the DCI structures as shown in FIGS. 22 and 23, the absolute indication method and the relative indication method as described above are applicable to indication of the carrier number (including the mask number).

FIGS. 24 to 29 exemplify cases of dynamically switching the DCI structure.

Figure 24:
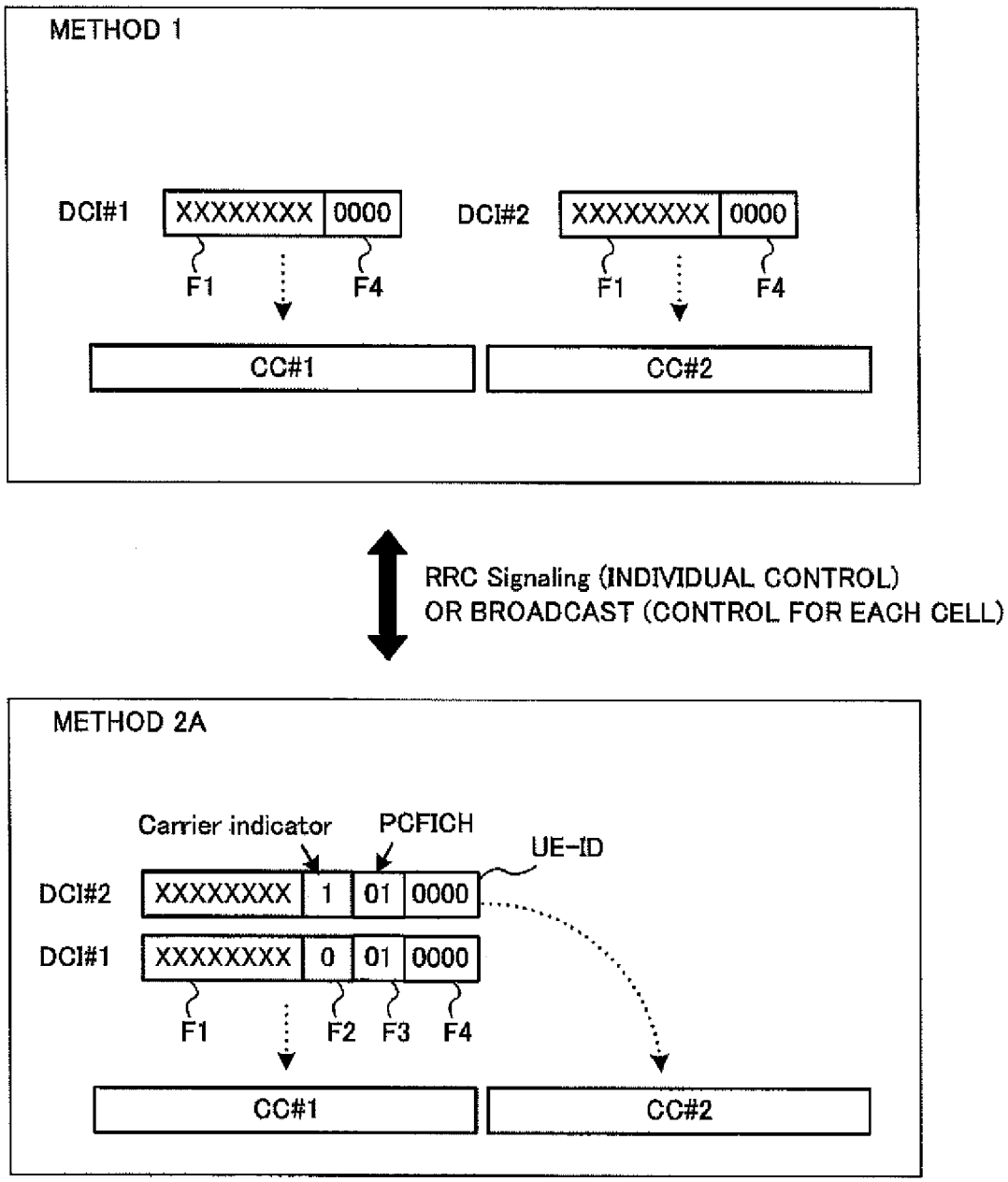
FIG. 24 is a diagram illustrating a method of dynamically switching the DCI structure.

In the upper stage of the FIG. 24 is shown the notification method (notification method 1) of the PDCCH defined in LTE, and in the lower stage is shown the notification method (notification method 2A) of the PDCCH as shown in FIG. 16. In transmitting the user data, the radio base station 20 notifies the mobile station apparatus 10 of the selected notification method (notification method 1 or notification method 2A). In the case of notifying each mobile terminal apparatus 10 individually, it is preferable that the notification is made through the radio resource control (RRC) signaling procedure of layer 3. Further, when the notification method is broadcast to mobile terminal apparatuses 10 in the same cell, it is possible to broadcast on the broadcast channel.

Figure 25:
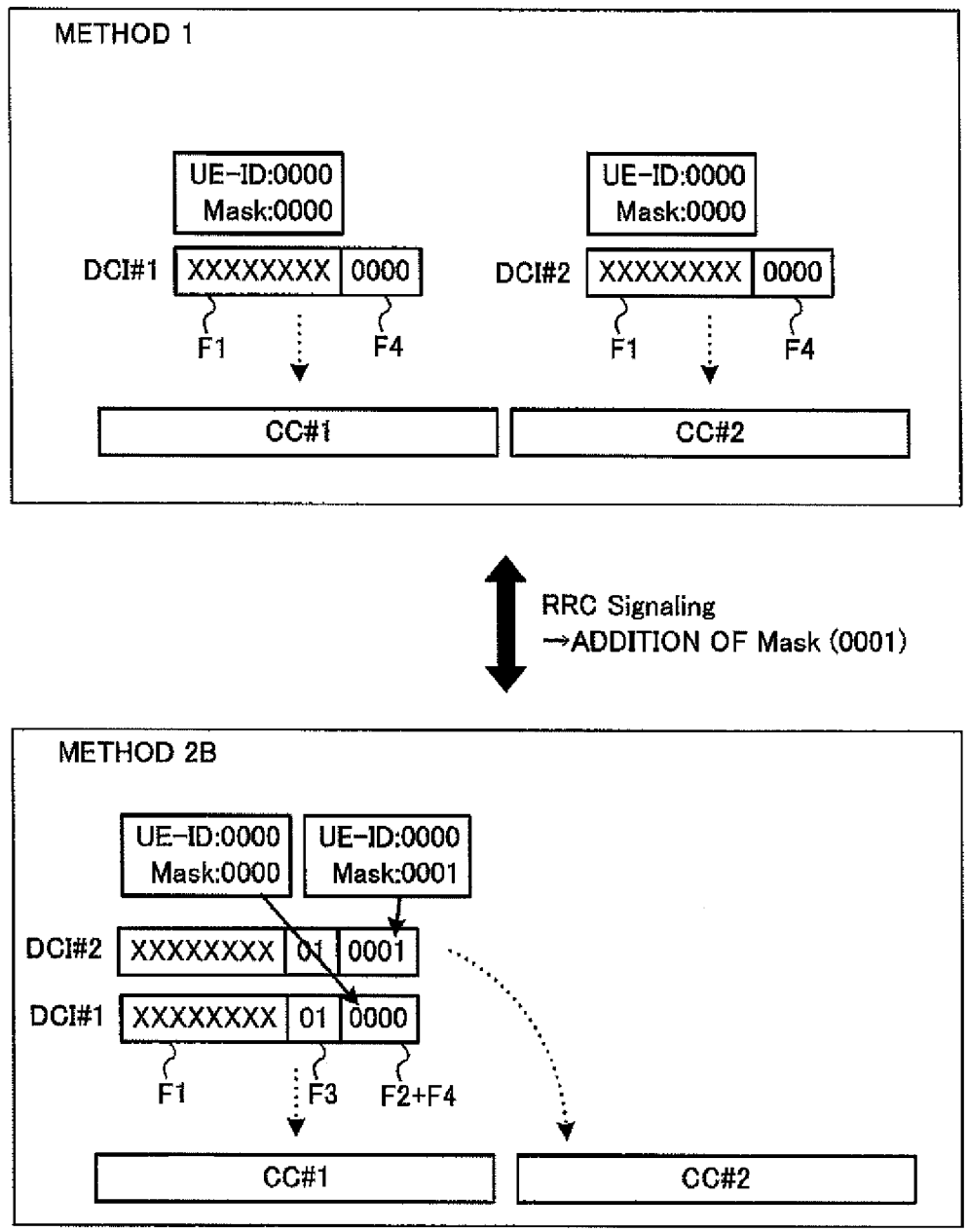
FIG. 25 is a diagram illustrating another method of dynamically switching the DCI structure.

FIG. 25 shows an example of switching between the notification method (notification method 1) of the PDCCH defined by LTE, and the notification method (notification method 2B) of the PDCCH as shown in FIG. 17. In this case, by RRC signaling, the base station apparatus notifies of switching of the notification method and the mask information (0001) added as the carrier number.

Figure 26:
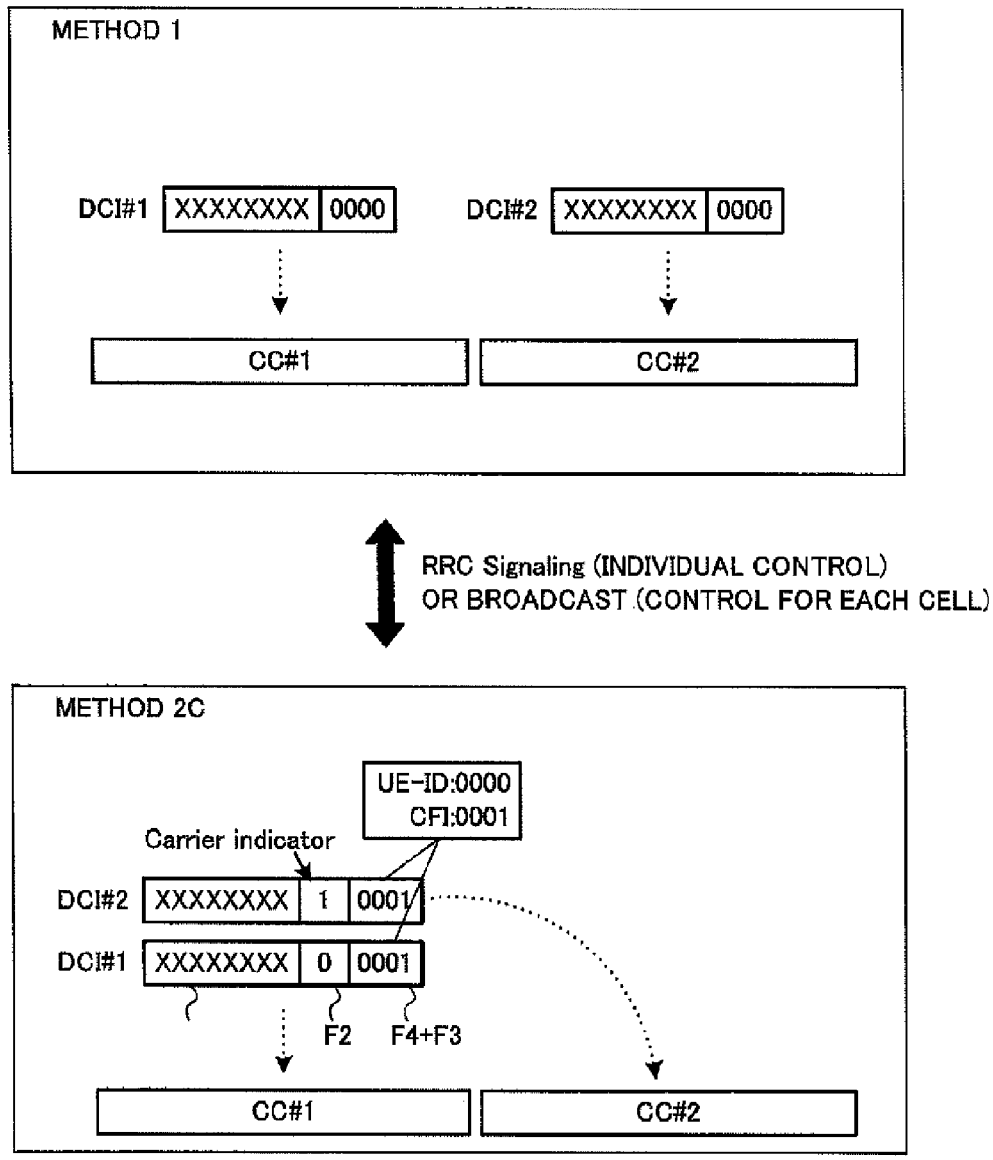
FIG. 26 is a diagram illustrating another method of dynamically switching the DCI structure.

FIG. 26 shows an example of switching between the notification method (notification method 1) of the PDCCH defined by LTE, and the notification method (notification method 2C) of the PDCCH as shown in FIG. 22. By RRC signaling or the broadcast channel, the base station apparatus 20 notifies the mobile station apparatus 10 of the selected notification method (notification method 1 or notification method 2C).

Figure 27:
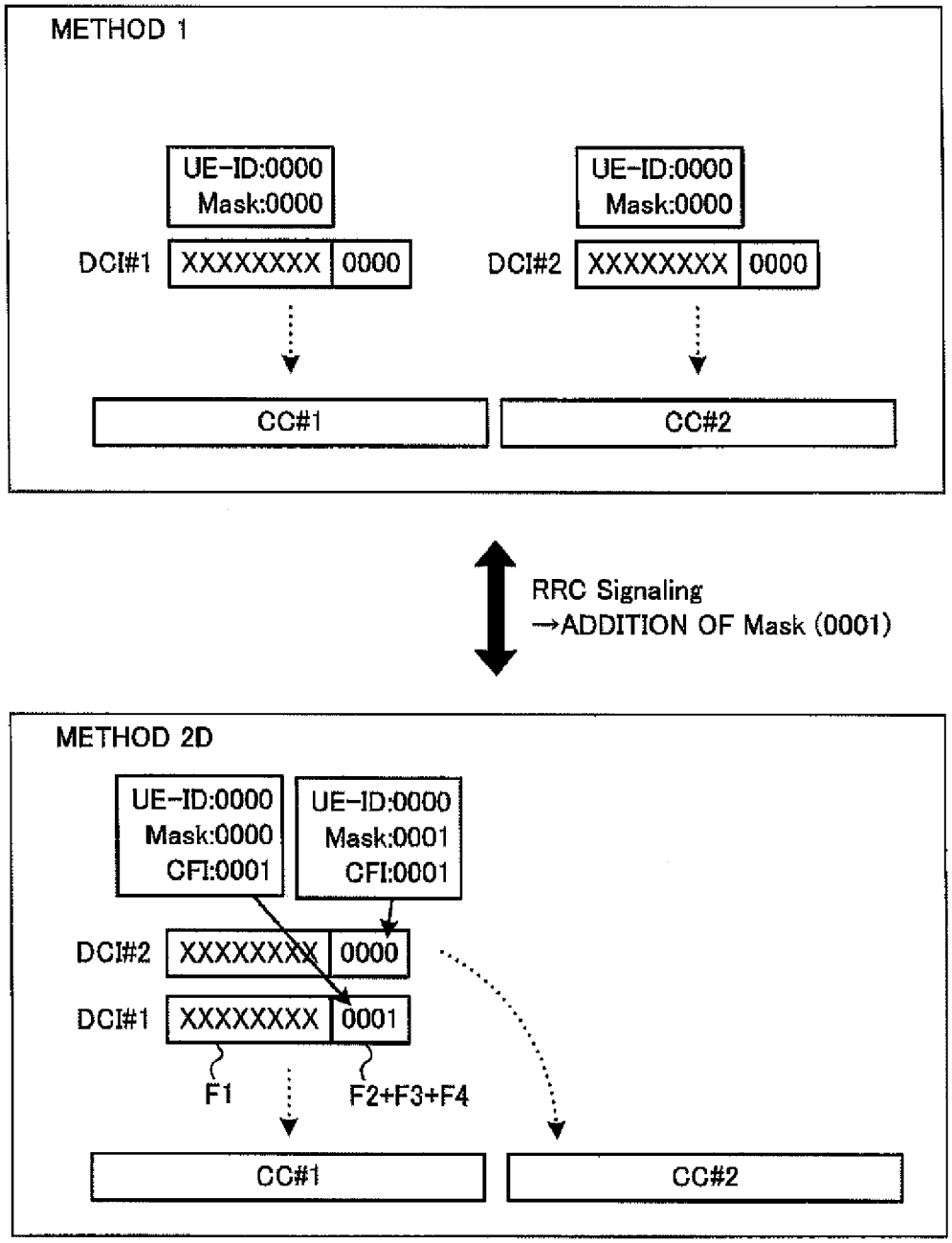
FIG. 27 is a diagram illustrating another method of dynamically switching the DCI structure.

FIG. 27 shows an example of switching between the notification method (notification method 1) of the PDCCH defined by LTE, and the notification method (notification method 2D) of the PDCCH as shown in FIG. 23. In this case, by RRC signaling, the base station apparatus notifies of switching of the notification method and the mask information (0001) added as the carrier number.

Figure 28:
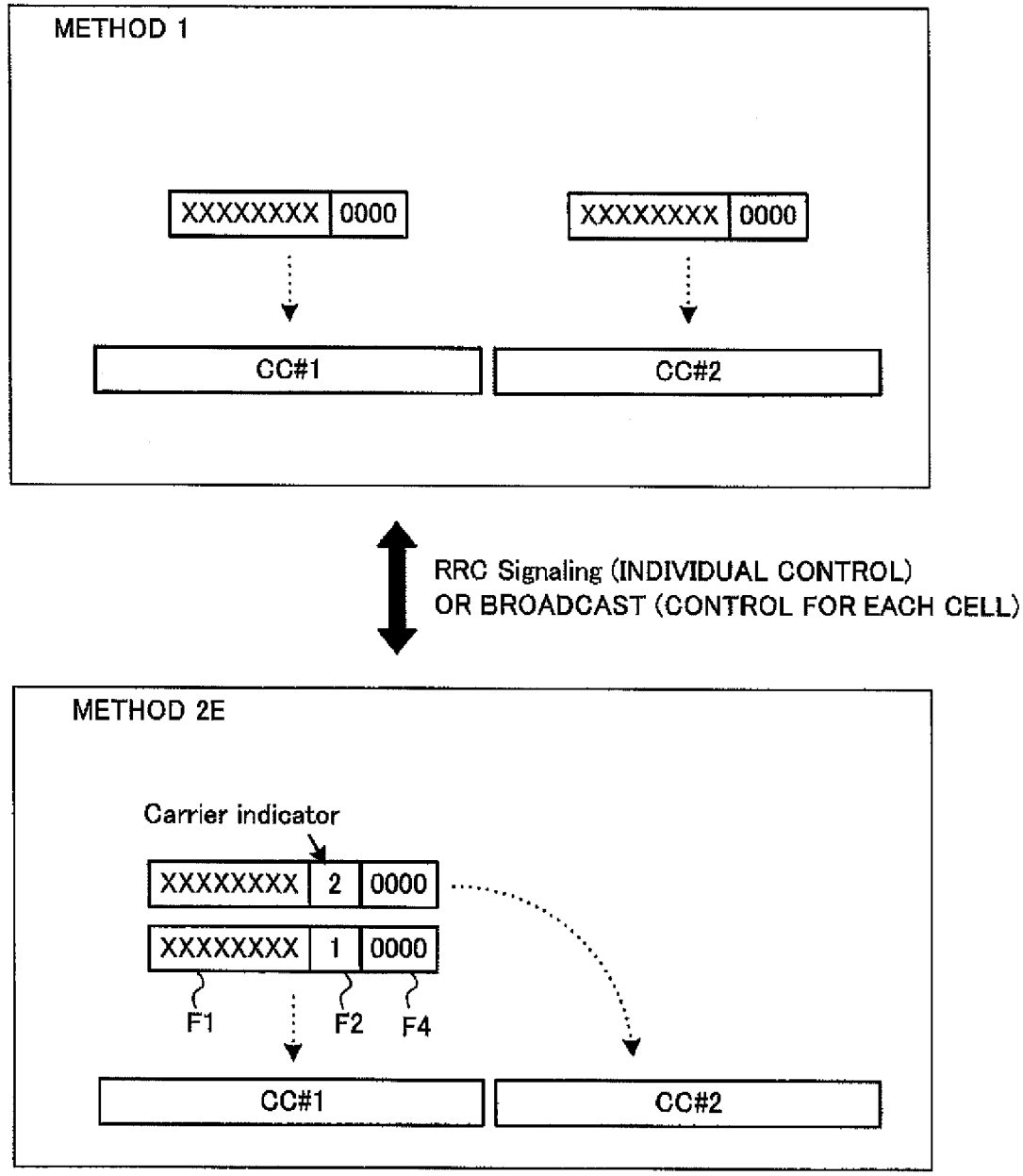
FIG. 28 is a diagram illustrating another method of dynamically switching the DCI structure.

FIG. 28 shows an example of switching between the notification method (notification method 1) of the PDCCH defined by LTE, and the notification method (notification method 2E) of the PDCCH as shown in FIG. 18. By RRC signaling or the broadcast channel, the base station apparatus 20 notifies the mobile station apparatus 10 of the selected notification method (notification method 1 or notification method 2E).

Figure 29:
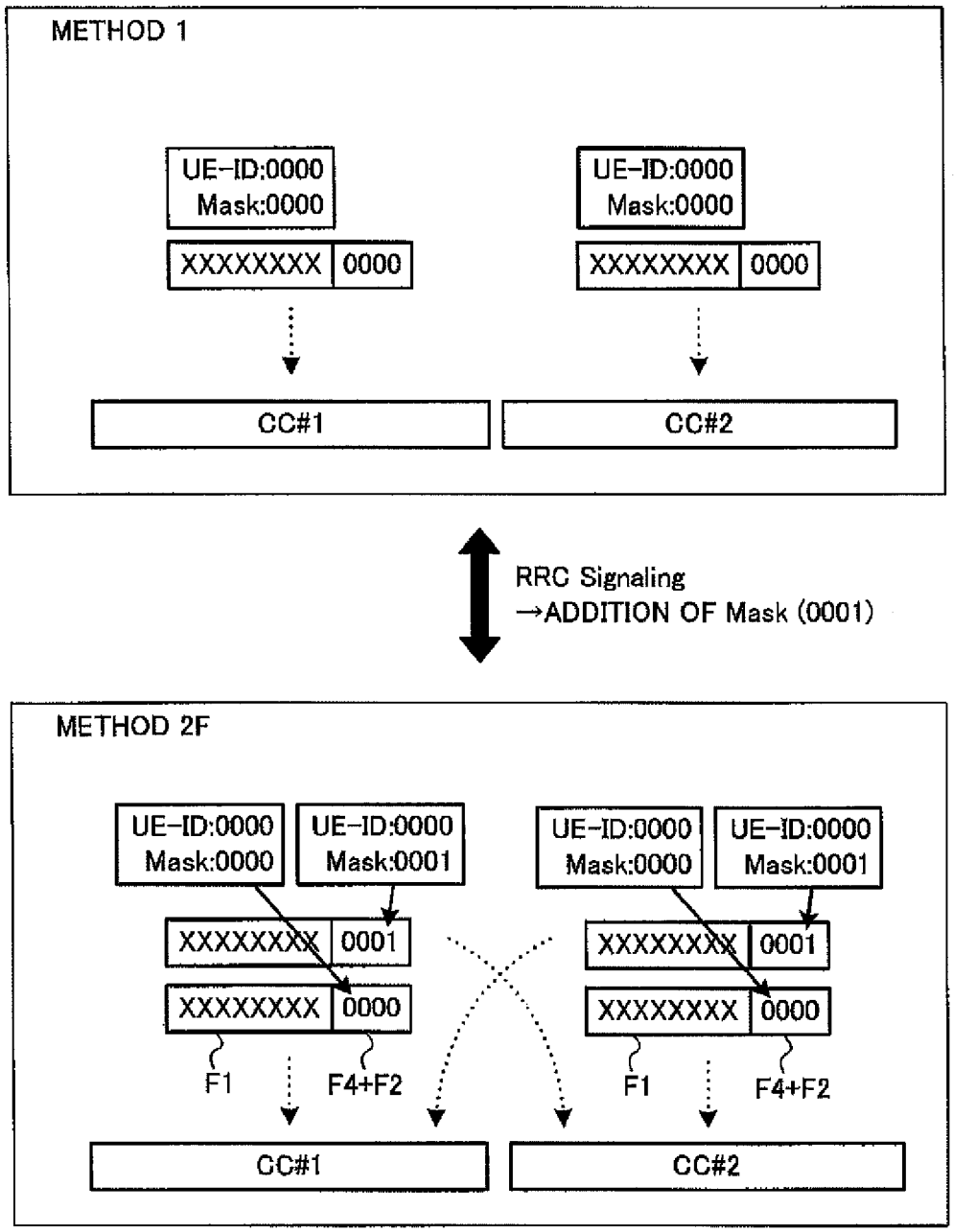
FIG. 29 is a diagram illustrating another method of dynamically switching the DCI structure.

FIG. 29 shows an example of switching between the notification method (notification method 1) of the PDCCH defined by LTE, and the notification method (notification method 2F) of the PDCCH as shown in FIG. 19. In this case, by RRC signaling, the base station apparatus notifies of switching of the notification method and the mask information (0001) added as the carrier number.

In addition, the semi-static DCI structure switching methods as shown in FIGS. 24 to 29 are applicable to switching between the DCI structure including the carrier number without including the CFI value and the DCI structure of LTE.

Then, in the case of scrambling the CRC based on the PCFICH of the assigned component carrier, to obtain the mask to scramble the CRC, there are a method of performing an exclusive OR operation between the CFI value and the user identifier (UE-ID) and a method of performing an operation of binary addition.

As the method of calculating an exclusive OR, for example, CFI=1, 2, 3 are converted into values of 0000, 0001, 0010, and exclusively ORed with the user identifier (UE-ID) (also the mask in the method 2B). Further, by generating another pattern such that CFI=1, 2, 3 are 0000, 001, 1010, an exclusive OR operation may be performed between the CFI and the user identifier (UE-ID).

As a method of simply calculating the sum, for example, CFI=1, 2, 3 are converted into values of 0000, 0001, 0010, and added to the user identifier (UE-ID) (also the mask in the method 2B) to obtain the sum (carry computation is performed on the above.)

Thus masking in the PCFICH (CFI value) has the merit that the number of bits does not increase, and on the other hand, can collide with the user identifier (UE-ID). For example, it is not possible to distinguish between UE-ID: 0000, PCFICH: 0001 and UE-ID: 0001, PCFICH: 0000.

Accordingly, it is important to perform masking so that the collision problem does not occur as possible. The inventors of the invention note that the CFI value of the PCFICH takes only three kinds (00, 01, 10), and define two lower-order bits of the bit pattern of the CFI value as shown in FIG. 30 in combination with two lower-order bits of the user identifier (UE-ID). The inventors found out that the above-mentioned colliding problem does not occur by always setting two lower-order bits at 00 when the base station apparatus 20 issues the user identifier (UE-ID). This is because the mask by CFI affects only the two lower-order bits by defining as described above, and any collision does not occur by using the UE-IDs with 14 higher-order bits being different.

Further, to improve tolerance to error of the PCFICH, the mobile terminal apparatus 10 that is the user equipment is capable of adopting the following method.

The mobile terminal apparatus 10 is provided with a PCFICH error detecting mechanism. The apparatus 10 extracts the user data from the data region (PDSCH) based on the CFI value notified on the PCFICH from the base station apparatus 20 and performs decoding (for example, turbo decoding). At this point, the detecting mechanism checks reliability of the reception signal by likelihood before and after turbo decoding, and when reliability is lower than a threshold, gives instructions to abandon the reception user data in a retransmission request. By this means, the apparatus 10 abandons the reception data which is extracted from the erroneous starting position of the PDSCH caused by PCFICH error, and therefore, is capable of receiving the data properly when the retransmitted PCFICH does not have any error.

Further, the mobile terminal apparatus 10 decodes reception data while changing the reading starting position of the PDSCH in each subframe, based on all the three kinds of CFI values (n=1, 2, 3) instead of using the CFI value notified on the PCFICH, and adopts the reception data with CRC being good. In other words, the reading starting position of the PDSCH is switched in the order of the second, third and fourth OFDM symbols in the first slot in each subframe.

Furthermore, a frame configuration that reduces the effect of PCFICH error may be adopted. For example, the PDSCH is arranged from the fourth OFDM symbol in the first slot in each subframe, and the last data of the PDSCH is multiplexed into the second and third OFDM symbols of the subframe. By adopting such a frame configuration, the data positions of the 4th to 14th OFDM symbols are fixed irrespective of the PCFICH, and therefore, the effect of PCFICH error is reduced.

In the above-mentioned descriptions, the invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2009-189505 filed on Aug. 18, 2009, entire content of which is expressly incorporated by reference herein.

The invention claimed is:

1. A radio communication control method comprising:
under carrier aggregation where first and second base frequency blocks are used to transmit transmission data in one transmission time unit, when cross-carrier scheduling is applied, assigning a first downlink control signal associated with transmission data to be transmitted with the first base frequency block, and a second downlink control signal associated with transmission data to be transmitted with the second base frequency block, to the second base frequency block;
including assignment information indicative of a start position in the one transmission time unit signal of the transmission data to be transmitted with the first base frequency block, in the first downlink control signal, by using a number of symbols assigned to the first downlink control signal; and
transmitting the first downlink control signal including the assignment information with the second base frequency block, wherein
when the cross-carrier scheduling is not applied, assigning the first downlink control signal and the second downlink control signal to the first base frequency block and the second base frequency block, respectively, so as to transmit the first downlink control signal with the first base frequency block and the second downlink control signal with the second base frequency block, and
whether or not to include the assignment information in the first downlink control signal is switched based on assignment status of the first and second frequency blocks for the transmission data and the first and second downlink control signals.

2. The radio communication control method according to claim 1, wherein a field to add the assignment information is added to the first downlink control signal.

3. The radio communication control method according to claim 1, wherein in the first downlink control signal, part of the first downlink control signal is masked with bit data representing the assignment information.

4. The radio communication control method according to claim 3, wherein part of the first downlink control signal to mask with the assignment information is an error correcting code added to the first downlink control signal.

5. The radio communication control method according to claim 3, wherein the error correcting code is masked with a user identification number assigned to a user terminal and the assignment information.

6. The radio communication control method according to claim 1, wherein in the case of switching between a communication scheme with the assignment information included in the first downlink control signal and another communication scheme without the assignment information being included in the first downlink control signal, a user terminal is notified of switching information of the communication scheme.

7. A radio communication control method applied to cross-carrier scheduling, under carrier aggregation where first and second base frequency blocks are used to transmit transmission data in one transmission unit, a first downlink control signal associated with transmission data to be transmitted with the first base frequency block, and a second downlink control signal associated with transmission data to be transmitted with the second base frequency block, being assigned to the second base frequency block in the cross-carrier scheduling, the method comprising:
receiving first and second base frequency blocks;
decoding the first downlink control signal from the second base frequency block received;
extracting assignment information indicative of a start position in the one transmission time unit, of the transmission data to be transmitted with the first base frequency block, from the first downlink control signal decoded, the assignment information being indicated by using a number of symbols assigned to the first downlink control signal; and
decoding the transmission data of the first base frequency block based on the extracted assignment information, wherein
when the cross-carrier scheduling is not applied, assigning the first downlink control signal and the second downlink control signal to the first base frequency block and the second base frequency block, respectively, so as to transmit the first downlink control signal with the first base frequency block and the second downlink control signal with the second base frequency block, and
whether or not to include the assignment information in the first downlink control signal is switched based on assignment status of the first and second frequency blocks for the transmission data and the first and second downlink control signals.

8. A radio base station apparatus comprising:
an assigning section configured, under carrier aggregation where first and second base frequency blocks are used to transmit transmission data in one transmission unit, when cross-carrier scheduling is applied, to assign a first downlink control signal associated with transmission data to be transmitted with the first base frequency block, and a second downlink control signal associated with transmission data to be transmitted with the second base frequency block, to the second base frequency block;

an assignment information adding section configured to add assignment information indicative of a start position in the one transmission time unit, of the transmission data to be transmitted with the first base frequency block, to the first downlink control signal, by using a number of symbols assigned to the first downlink control signal; and a transmitting section configured to transmit the first downlink control signal including the assignment information with the second base frequency block, wherein when the cross-carrier scheduling is not applied, assigning the first downlink control signal and the second downlink control signal to the first base frequency block and the second base frequency block, respectively, so as to transmit the first downlink control signal with the first base frequency block and the second downlink control signal with the second base frequency block, and whether or not to include the assignment information in the first downlink control signal is switched based on assignment status of the first and second frequency blocks for the transmission data and the first and second downlink control signals.

9. A mobile terminal apparatus applied to cross-carrier scheduling, under carrier aggregation where first and second base frequency blocks are used to transmit transmission data in one transmission unit, a first downlink control signal associated with transmission data to be transmitted with the first base frequency block, and a second downlink control signal associated with transmission data to be transmitted with the second base frequency block, being assigned to the second base frequency block in the cross-carrier scheduling, the mobile terminal apparatus comprising:

a signal receiving section configured to receive first and second base frequency blocks;

a control data receiving section configured to decode the first downlink control signal from the second base frequency block received, and to extract assignment information indicative of a start position in the one transmission time unit, of the transmission data to be transmitted with the first base frequency block, from the first downlink control signal decoded, the assignment information being indicated by using a number of symbols assigned to the first downlink control signal; and a downlink transmission data receiving section configured to decode the transmission data of the first base frequency block based on the extracted assignment information, wherein when the cross-carrier scheduling is not applied, assigning the first downlink control signal and the second downlink control signal to the first base frequency block and the second base frequency block, respectively, so as to transmit the first downlink control signal with the first base frequency block and the second downlink control signal with the second base frequency block, and whether or not to include the assignment information in the first downlink control signal is switched based on assignment status of the first and second frequency blocks for the transmission data and the first and second downlink control signals.

* * * * *